US008327104B2

(12) United States Patent
Smith et al.

(10) Patent No.: US 8,327,104 B2
(45) Date of Patent: *Dec. 4, 2012

(54) ADJUSTING THE TIMING OF SIGNALS ASSOCIATED WITH A MEMORY SYSTEM

(75) Inventors: Michael John Sebastian Smith, Palo Alto, CA (US); Daniel L. Rosenband, San Mateo, CA (US); David T. Wang, San Jose, CA (US); Suresh Natarajan Rajan, San Jose, CA (US)

(73) Assignee: Google Inc., Mountain View, CA (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/939,440

(22) Filed: Nov. 13, 2007

(65) Prior Publication Data

US 2008/0115006 A1    May 15, 2008

Related U.S. Application Data

(63) Continuation-in-part of application No. 11/524,811, filed on Sep. 20, 2006, now Pat. No. 7,590,796, which is a continuation-in-part of application No. 11/461,439, filed on Jul. 31, 2006, now Pat. No. 7,580,312.

(60) Provisional application No. 60/865,627, filed on Nov. 13, 2006.

(51) Int. Cl.
*G06F 13/00* (2006.01)

(52) U.S. Cl. ........................................ 711/167; 711/154

(58) Field of Classification Search .................. 711/154, 711/167
See application file for complete search history.

(56) References Cited

U.S. PATENT DOCUMENTS

| 3,800,292 A | 3/1974 | Curley et al. |
| 4,069,452 A | 1/1978 | Conway et al. |
| 4,323,965 A | 4/1982 | Johnson et al. |
| 4,334,307 A | 6/1982 | Bourgeois et al. |
| 4,345,319 A | 8/1982 | Bernardini et al. |
| 4,392,212 A | 7/1983 | Miyasaka et al. ............. 365/230 |
| 4,525,921 A | 7/1985 | Carson et al. |
| 4,566,082 A | 1/1986 | Anderson |
| 4,592,019 A | 5/1986 | Huang et al. ..................... 365/78 |
| 4,646,128 A | 2/1987 | Carson et al. |
| 4,698,748 A | 10/1987 | Juzswik et al. ............... 364/200 |
| 4,706,166 A | 11/1987 | Go |

(Continued)

FOREIGN PATENT DOCUMENTS

DE    102004051345    5/2006

(Continued)

OTHER PUBLICATIONS

Final Rejection From U.S. Appl. No. 11/461,437 Mailed Nov. 10, 2009.

(Continued)

*Primary Examiner* — Reba I Elmore
(74) *Attorney, Agent, or Firm* — Fish & Richardson P.C.

(57) ABSTRACT

A system and method are provided for adjusting the timing of signals associated with a memory system. A memory controller is provided. Additionally, at least one memory module is provided. Further, at least one interface circuit is provided, the interface circuit capable of adjusting timing of signals associated with one or more of the memory controller and the at least one memory module.

30 Claims, 5 Drawing Sheets

U.S. PATENT DOCUMENTS

| | | | |
|---|---|---|---|
| 4,710,903 A | 12/1987 | Hereth et al. ................. 365/194 |
| 4,764,846 A | 8/1988 | Go |
| 4,780,843 A | 10/1988 | Tietjen .......................... 364/900 |
| 4,794,597 A | 12/1988 | Ooba et al. |
| 4,796,232 A | 1/1989 | House .......................... 365/189 |
| 4,807,191 A | 2/1989 | Flannagan |
| 4,841,440 A | 6/1989 | Yonezu et al. ................ 364/200 |
| 4,862,347 A | 8/1989 | Rudy |
| 4,884,237 A | 11/1989 | Mueller et al. |
| 4,887,240 A | 12/1989 | Garverick et al. ............ 361/222 |
| 4,888,687 A | 12/1989 | Allison et al. |
| 4,899,107 A | 2/1990 | Corbett et al. ................ 324/158 |
| 4,912,678 A | 3/1990 | Mashiko |
| 4,922,451 A | 5/1990 | Lo et al. |
| 4,935,734 A | 6/1990 | Austin ..................... 340/825.83 |
| 4,937,791 A | 6/1990 | Steele et al. |
| 4,956,694 A | 9/1990 | Eide |
| 4,982,265 A | 1/1991 | Watanabe et al. |
| 4,983,533 A | 1/1991 | Go |
| 5,025,364 A | 6/1991 | Zellmer |
| 5,072,424 A | 12/1991 | Brent et al. ................... 365/189 |
| 5,083,266 A | 1/1992 | Watanabe ..................... 395/275 |
| 5,104,820 A | 4/1992 | Go et al. |
| 5,193,072 A | 3/1993 | Frenkil et al. |
| 5,212,666 A | 5/1993 | Takeda |
| 5,220,672 A | 6/1993 | Nakao et al. .................. 395/750 |
| 5,241,266 A | 8/1993 | Ahmad et al. ................ 324/158 |
| 5,252,807 A | 10/1993 | Chizinsky .................... 219/390 |
| 5,257,233 A | 10/1993 | Schaefer ....................... 365/227 |
| 5,278,796 A | 1/1994 | Tillinghast et al. ........... 365/211 |
| 5,282,177 A | 1/1994 | McLaury ...................... 365/230 |
| 5,332,922 A | 7/1994 | Oguchi et al. ................ 257/723 |
| 5,347,428 A | 9/1994 | Carson et al. |
| 5,369,749 A | 11/1994 | Baker et al. |
| 5,384,745 A | 1/1995 | Konishi et al. ........... 365/230.03 |
| 5,388,265 A | 2/1995 | Volk ............................. 395/750 |
| 5,390,334 A | 2/1995 | Harrison |
| 5,408,190 A | 4/1995 | Wood et al. .................. 324/765 |
| 5,418,924 A * | 5/1995 | Dresser ......................... 713/600 |
| 5,432,729 A | 7/1995 | Carson et al. |
| 5,448,511 A | 9/1995 | Paurus et al. |
| 5,453,434 A | 9/1995 | Albaugh et al. .............. 514/397 |
| 5,467,455 A | 11/1995 | Gay et al. ..................... 395/281 |
| 5,483,497 A | 1/1996 | Mochizuki et al. |
| 5,498,886 A | 3/1996 | Hsu et al. ...................... 257/213 |
| 5,502,333 A | 3/1996 | Bertin et al. |
| 5,502,667 A | 3/1996 | Bertin et al. |
| 5,513,135 A | 4/1996 | Dell et al. |
| 5,513,339 A | 4/1996 | Agrawal et al. |
| 5,519,832 A | 5/1996 | Warchol |
| 5,526,320 A | 6/1996 | Zagar et al. ................... 365/233 |
| 5,530,836 A | 6/1996 | Busch et al. .................. 395/477 |
| 5,550,781 A | 8/1996 | Sugawara et al. |
| 5,559,990 A | 9/1996 | Cheng et al. ................. 395/484 |
| 5,561,622 A | 10/1996 | Bertin et al. |
| 5,563,086 A | 10/1996 | Bertin et al. |
| 5,566,344 A | 10/1996 | Hall et al. ..................... 395/800 |
| 5,581,498 A | 12/1996 | Ludwig et al. |
| 5,581,779 A | 12/1996 | Hall et al. ..................... 395/800 |
| 5,590,071 A | 12/1996 | Kolor et al. ................... 365/149 |
| 5,598,376 A | 1/1997 | Merritt et al. ................. 365/230 |
| 5,604,714 A | 2/1997 | Manning et al. .............. 365/230 |
| 5,606,710 A | 2/1997 | Hall et al. ..................... 395/800 |
| 5,608,262 A | 3/1997 | Degani et al. |
| 5,610,864 A | 3/1997 | Manning ....................... 365/193 |
| 5,623,686 A | 4/1997 | Hall et al. ..................... 395/800 |
| 5,627,791 A | 5/1997 | Wright et al. ................. 365/222 |
| 5,640,337 A | 6/1997 | Huang et al. ................. 364/578 |
| 5,640,364 A | 6/1997 | Merritt et al. ................. 365/233 |
| 5,652,724 A | 7/1997 | Manning ....................... 365/189 |
| 5,654,204 A | 8/1997 | Anderson ....................... 438/15 |
| 5,661,677 A | 8/1997 | Rondeau et al. ................ 365/63 |
| 5,661,695 A | 8/1997 | Zagar et al. ................... 365/233 |
| 5,668,773 A | 9/1997 | Zagar et al. ................... 365/233 |
| 5,675,549 A | 10/1997 | Ong et al. ..................... 365/233 |
| 5,680,342 A | 10/1997 | Frankeny |
| 5,682,354 A | 10/1997 | Manning ....................... 365/233 |
| 5,692,121 A | 11/1997 | Bozso et al. |
| 5,692,202 A | 11/1997 | Kardach et al. ............... 395/750 |
| 5,696,732 A | 12/1997 | Zagar et al. ................... 365/233 |
| 5,702,984 A | 12/1997 | Bertin et al. |
| 5,703,813 A | 12/1997 | Manning et al. .............. 365/189 |
| 5,706,247 A | 1/1998 | Merritt et al. ................. 365/233 |
| RE35,733 E | 2/1998 | Hernandez et al. |
| 5,717,654 A | 2/1998 | Manning ....................... 365/233 |
| 5,721,859 A | 2/1998 | Manning ....................... 397/421 |
| 5,724,288 A | 3/1998 | Cloud et al. ................... 365/193 |
| 5,729,503 A | 3/1998 | Manning ....................... 365/233 |
| 5,729,504 A | 3/1998 | Cowles ......................... 365/236 |
| 5,742,792 A | 4/1998 | Yanai et al. |
| 5,748,914 A | 5/1998 | Barth et al. .................... 395/285 |
| 5,752,045 A | 5/1998 | Chen ............................. 395/750 |
| 5,757,703 A | 5/1998 | Merritt et al. ................. 365/189 |
| 5,761,703 A | 6/1998 | Bolyn ............................ 711/106 |
| 5,781,766 A | 7/1998 | Davis ............................ 395/552 |
| 5,787,457 A | 7/1998 | Miller et al. |
| 5,798,961 A | 8/1998 | Heyden et al. .................. 365/52 |
| 5,802,010 A | 9/1998 | Zagar et al. ................... 365/233 |
| 5,802,395 A | 9/1998 | Connolly et al. |
| 5,802,555 A | 9/1998 | Shigeeda ....................... 711/106 |
| 5,812,488 A | 9/1998 | Zagar et al. ................... 365/233 |
| 5,818,788 A | 10/1998 | Kimura et al. |
| 5,819,065 A | 10/1998 | Chilton et al. |
| 5,831,833 A | 11/1998 | Shirakawa et al. |
| 5,831,931 A | 11/1998 | Manning ....................... 365/233 |
| 5,831,932 A | 11/1998 | Merritt et al. ................. 365/233 |
| 5,834,838 A | 11/1998 | Anderson ...................... 257/697 |
| 5,835,435 A | 11/1998 | Bogin et al. ..................... 365/22 |
| 5,838,165 A | 11/1998 | Chatter |
| 5,838,177 A | 11/1998 | Keeth ............................ 327/108 |
| 5,841,580 A | 11/1998 | Farmwald et al. ............ 365/194 |
| 5,843,799 A | 12/1998 | Hsu et al. .......................... 438/6 |
| 5,843,807 A | 12/1998 | Burns |
| 5,845,108 A | 12/1998 | Yoo et al. ...................... 395/551 |
| 5,850,368 A | 12/1998 | Ong et al. ..................... 365/238 |
| 5,859,792 A | 1/1999 | Rondeau et al. ................ 365/52 |
| 5,860,106 A | 1/1999 | Domen et al. ................. 711/137 |
| 5,870,347 A | 2/1999 | Keeth et al. ................... 365/230 |
| 5,870,350 A | 2/1999 | Bertin et al. |
| 5,872,907 A | 2/1999 | Griess et al. |
| 5,875,142 A | 2/1999 | Chevallier .................... 365/212 |
| 5,878,279 A | 3/1999 | Athenes |
| 5,884,088 A | 3/1999 | Kardach et al. .......... 395/750.06 |
| 5,901,105 A | 5/1999 | Ong et al. ................. 365/230.06 |
| 5,903,500 A | 5/1999 | Tsang et al. .............. 365/189.05 |
| 5,905,688 A | 5/1999 | Park ............................... 365/227 |
| 5,907,512 A | 5/1999 | Parkinson et al. ............ 365/195 |
| 5,913,072 A | 6/1999 | Wierenga |
| 5,915,105 A | 6/1999 | Farmwald et al. ............ 395/309 |
| 5,915,167 A | 6/1999 | Leedy |
| 5,917,758 A | 6/1999 | Keeth ....................... 365/189.05 |
| 5,923,611 A | 7/1999 | Ryan ............................. 365/233 |
| 5,924,111 A | 7/1999 | Huang et al. |
| 5,926,435 A | 7/1999 | Park et al. |
| 5,929,650 A | 7/1999 | Pappert et al. ................ 324/763 |
| 5,943,254 A | 8/1999 | Bakeman, Jr. et al. |
| 5,946,265 A | 8/1999 | Cowles ......................... 365/233 |
| 5,949,254 A | 9/1999 | Keeth ............................... 326/87 |
| 5,953,215 A | 9/1999 | Karabatsos |
| 5,953,263 A | 9/1999 | Farmwald et al. ............ 365/194 |
| 5,954,804 A | 9/1999 | Farmwald et al. .............. 710/36 |
| 5,956,233 A | 9/1999 | Yew et al. |
| 5,962,435 A | 10/1999 | Mao et al. ........................ 514/63 |
| 5,963,429 A | 10/1999 | Chen |
| 5,963,463 A | 10/1999 | Rondeau et al. ................ 365/52 |
| 5,963,464 A | 10/1999 | Dell et al. |
| 5,963,504 A | 10/1999 | Manning ....................... 365/233 |
| 5,966,724 A | 10/1999 | Ryan ............................. 711/105 |
| 5,966,727 A | 10/1999 | Nishino ........................ 711/127 |
| 5,969,996 A | 10/1999 | Muranaka et al. ........ 365/189.01 |
| 5,973,392 A | 10/1999 | Senba et al. |
| 5,995,424 A | 11/1999 | Lawrence et al. |
| 5,995,443 A | 11/1999 | Farmwald et al. ............ 365/233 |
| 6,001,671 A | 12/1999 | Fjelstad |
| 6,002,613 A | 12/1999 | Cloud et al. ................... 365/189 |
| 6,002,627 A | 12/1999 | Chevallier .................... 365/212 |
| 6,014,339 A | 1/2000 | Kobayashi et al. ........... 365/233 |

| | | | | | | | |
|---|---|---|---|---|---|---|---|
| 6,016,282 | A | 1/2000 | Keeth .................. 365/233 | 6,378,020 | B2 | 4/2002 | Farmwald et al. ........... 710/129 |
| 6,026,050 | A | 2/2000 | Baker et al. ............ 365/233 | 6,381,188 | B1 | 4/2002 | Choi et al. ............... 365/222 |
| 6,029,250 | A | 2/2000 | Keeth .................. 713/400 | 6,381,668 | B1 | 4/2002 | Lunteren ..................... 711/5 |
| 6,032,214 | A | 2/2000 | Farmwald et al. ........... 710/129 | 6,389,514 | B1 | 5/2002 | Rokicki |
| 6,032,215 | A | 2/2000 | Farmwald et al. ........... 710/129 | 6,392,304 | B1 | 5/2002 | Butler |
| 6,034,916 | A | 3/2000 | Lee ...................... 365/233 | 6,414,868 | B1 | 7/2002 | Wong et al. ............... 365/51 |
| 6,034,918 | A | 3/2000 | Farmwald et al. ........... 365/233 | 6,418,034 | B1 | 7/2002 | Weber et al. |
| 6,035,365 | A | 3/2000 | Farmwald et al. ........... 710/129 | 6,421,754 | B1 | 7/2002 | Kau et al. |
| 6,038,195 | A | 3/2000 | Farmwald et al. ........... 365/233 | 6,424,532 | B2 | 7/2002 | Kawamura |
| 6,038,673 | A | 3/2000 | Benn et al. ............... 713/323 | 6,426,916 | B2 | 7/2002 | Farmwald et al. ........... 365/233 |
| 6,044,032 | A | 3/2000 | Li ........................ 365/230 | 6,429,029 | B1 | 8/2002 | Eldridge et al. ............. 438/14 |
| 6,047,073 | A | 4/2000 | Norris et al. | 6,430,103 | B2 | 8/2002 | Nakayama et al. ...... 365/230.03 |
| 6,047,344 | A | 4/2000 | Kawasumi et al. ........... 710/107 | 6,437,600 | B1 | 8/2002 | Keeth .................... 326/86 |
| 6,053,948 | A | 4/2000 | Vaidyanathan et al. ......... 703/14 | 6,438,057 | B1 | 8/2002 | Ruckerbauer ............ 365/222 |
| 6,058,451 | A | 5/2000 | Bermingham et al. | 6,442,698 | B2 | 8/2002 | Nizar .................... 713/320 |
| 6,065,092 | A | 5/2000 | Roy | 6,445,591 | B1 | 9/2002 | Kwong |
| 6,069,504 | A | 5/2000 | Keeth .................... 327/108 | 6,452,826 | B1 | 9/2002 | Kim et al. |
| 6,070,217 | A | 5/2000 | Connolly et al. | 6,452,863 | B2 | 9/2002 | Farmwald et al. ........... 365/233 |
| 6,073,223 | A | 6/2000 | McAllister et al. ........... 711/167 | 6,453,400 | B1 | 9/2002 | Maesako et al. ............. 711/167 |
| 6,075,730 | A | 6/2000 | Barth et al. ............... 365/191 | 6,453,402 | B1 | 9/2002 | Jeddeloh .................. 711/167 |
| 6,075,744 | A | 6/2000 | Tsern et al. ............... 365/230 | 6,453,434 | B2 | 9/2002 | Delp et al. |
| 6,078,546 | A | 6/2000 | Lee ...................... 365/233 | 6,455,348 | B1 | 9/2002 | Yamaguchi |
| 6,079,025 | A | 6/2000 | Fung ..................... 713/323 | 6,457,095 | B1 | 9/2002 | Volk ..................... 711/105 |
| 6,084,434 | A | 7/2000 | Keeth .................... 326/87 | 6,459,651 | B1 | 10/2002 | Lee et al. ................. 365/233 |
| 6,088,290 | A | 7/2000 | Ohtake et al. ............. 365/233 | 6,473,831 | B1 | 10/2002 | Schade ................... 711/115 |
| 6,091,251 | A | 7/2000 | Wood et al. .............. 324/755 | 6,476,476 | B1 | 11/2002 | Glenn |
| RE36,839 | E | 8/2000 | Simmons et al. ............. 326/93 | 6,480,929 | B1 | 11/2002 | Gauthier et al. ............. 711/105 |
| 6,101,152 | A | 8/2000 | Farmwald et al. ........... 365/233 | 6,487,102 | B1 | 11/2002 | Halbert et al. |
| 6,101,564 | A | 8/2000 | Athenes et al. | 6,489,669 | B2 | 12/2002 | Shimada et al. |
| 6,101,612 | A | 8/2000 | Jeddeloh .................. 713/401 | 6,490,161 | B1 | 12/2002 | Johnson |
| 6,108,795 | A | 8/2000 | Jeddeloh .................. 713/401 | 6,492,726 | B1 | 12/2002 | Quek et al. |
| 6,111,812 | A | 8/2000 | Gans et al. ............... 365/233 | 6,493,789 | B2 | 12/2002 | Ware et al. ............... 711/105 |
| 6,125,072 | A | 9/2000 | Wu | 6,496,440 | B2 | 12/2002 | Manning ............... 365/230.03 |
| 6,134,638 | A | 10/2000 | Olarig et al. ............... 711/167 | 6,496,897 | B2 | 12/2002 | Ware et al. ............... 711/105 |
| 6,154,370 | A | 11/2000 | Degani et al. | 6,498,766 | B2 | 12/2002 | Lee et al. ................. 365/233 |
| 6,166,991 | A | 12/2000 | Phelan ................... 365/233 | 6,510,097 | B2 | 1/2003 | Fukuyama .............. 365/230.03 |
| 6,181,640 | B1 | 1/2001 | Kang | 6,510,503 | B2 | 1/2003 | Gillingham et al. ........... 711/167 |
| 6,182,184 | B1 | 1/2001 | Farmwald et al. ........... 710/129 | 6,512,392 | B2 | 1/2003 | Fleury et al. ................ 324/765 |
| 6,199,151 | B1 | 3/2001 | Williams et al. | 6,521,984 | B2 | 2/2003 | Matsuura |
| 6,208,168 | B1 | 3/2001 | Rhee ...................... 326/83 | 6,526,471 | B1 | 2/2003 | Shimomura et al. ............ 711/5 |
| 6,216,246 | B1 | 4/2001 | Shau ..................... 714/763 | 6,526,473 | B1 | 2/2003 | Kim |
| 6,222,739 | B1 | 4/2001 | Bhakta et al. | 6,526,484 | B1 | 2/2003 | Stacovsky et al. ........... 711/158 |
| 6,226,709 | B1 | 5/2001 | Goodwin et al. | 6,545,895 | B1 | 4/2003 | Li et al. |
| 6,226,730 | B1 | 5/2001 | Murdoch et al. | 6,546,446 | B2 | 4/2003 | Farmwald et al. ........... 710/305 |
| 6,226,754 | B1 * | 5/2001 | Ware et al. ............... 713/400 | 6,553,450 | B1 | 4/2003 | Dodd et al. ................ 711/105 |
| 6,233,192 | B1 | 5/2001 | Tanaka | 6,560,158 | B2 | 5/2003 | Choi et al. ................. 365/226 |
| 6,233,650 | B1 | 5/2001 | Johnson et al. | 6,563,337 | B2 | 5/2003 | Dour ...................... 326/30 |
| 6,240,048 | B1 | 5/2001 | Matsubara ................ 365/233 | 6,563,759 | B2 | 5/2003 | Yahata et al. ............... 365/233 |
| 6,243,282 | B1 | 6/2001 | Rondeau et al. .............. 365/52 | 6,564,281 | B2 | 5/2003 | Farmwald et al. ........... 710/305 |
| 6,252,807 | B1 | 6/2001 | Suzuki et al. | 6,564,285 | B1 | 5/2003 | Mills et al. ................ 711/103 |
| 6,260,097 | B1 | 7/2001 | Farmwald et al. ........... 710/129 | 6,574,150 | B2 | 6/2003 | Suyama et al. .......... 365/189.05 |
| 6,260,154 | B1 | 7/2001 | Jeddeloh .................. 713/401 | 6,574,153 | B2 * | 6/2003 | Ware et al. ............... 365/194 |
| 6,262,938 | B1 | 7/2001 | Lee et al. ................. 365/233 | 6,584,037 | B2 | 6/2003 | Farmwald et al. ........... 365/233 |
| 6,266,285 | B1 | 7/2001 | Farmwald et al. ........... 365/194 | 6,587,912 | B2 | 7/2003 | Leddige et al. ................ 711/5 |
| 6,266,292 | B1 | 7/2001 | Tsern et al. ............... 365/230 | 6,590,822 | B2 | 7/2003 | Hwang et al. ............... 365/222 |
| 6,274,395 | B1 | 8/2001 | Weber .................... 438/14 | 6,594,770 | B1 | 7/2003 | Sato et al. ................. 713/320 |
| 6,279,069 | B1 | 8/2001 | Robinson et al. ............ 711/103 | 6,597,616 | B2 | 7/2003 | Tsern et al. ............... 365/222 |
| 6,295,572 | B1 | 9/2001 | Wu ....................... 710/131 | 6,597,617 | B2 | 7/2003 | Ooishi et al. |
| 6,298,426 | B1 | 10/2001 | Ajanovic .................. 711/172 | 6,614,700 | B2 | 9/2003 | Dietrich et al. ............. 365/194 |
| 6,304,511 | B1 | 10/2001 | Gans et al. ............... 365/233 | 6,618,267 | B1 | 9/2003 | Dalal et al. |
| 6,307,769 | B1 | 10/2001 | Nuxoll et al. ............... 365/63 | 6,618,791 | B1 | 9/2003 | Dodd et al. ................ 711/105 |
| 6,314,051 | B1 | 11/2001 | Farmwald et al. ........... 365/233 | 6,621,760 | B1 | 9/2003 | Ahmad et al. ............... 365/233 |
| 6,317,352 | B1 | 11/2001 | Halbert et al. ................ 365/52 | 6,628,538 | B2 | 9/2003 | Funaba et al. |
| 6,317,381 | B1 | 11/2001 | Gans et al. ............... 365/233 | 6,630,729 | B2 | 10/2003 | Huang |
| 6,324,120 | B2 | 11/2001 | Farmwald et al. ........... 365/233 | 6,631,086 | B1 | 10/2003 | Bill et al. ................ 365/185.09 |
| 6,326,810 | B1 | 12/2001 | Keeth ..................... 326/83 | 6,639,820 | B1 | 10/2003 | Khandekar et al. |
| 6,327,664 | B1 | 12/2001 | Dell et al. ................. 713/323 | 6,646,939 | B2 | 11/2003 | Kwak |
| 6,330,683 | B1 | 12/2001 | Jeddeloh .................. 713/401 | 6,650,588 | B2 | 11/2003 | Yamagata ................. 365/222 |
| 6,336,174 | B1 | 1/2002 | Li et al. | 6,650,594 | B1 | 11/2003 | Lee et al. ................. 365/233 |
| 6,338,108 | B1 | 1/2002 | Motomura ................ 710/110 | 6,657,634 | B1 | 12/2003 | Sinclair et al. |
| 6,338,113 | B1 | 1/2002 | Kubo et al. ................ 711/105 | 6,657,918 | B2 | 12/2003 | Foss et al. ................ 365/233 |
| 6,341,347 | B1 | 1/2002 | Joy et al. .................. 712/228 | 6,657,919 | B2 | 12/2003 | Foss et al. ................ 365/233 |
| 6,343,019 | B1 | 1/2002 | Jiang et al. | 6,658,016 | B1 | 12/2003 | Dai et al. |
| 6,343,042 | B1 | 1/2002 | Tsern et al. ............... 365/222 | 6,658,530 | B1 | 12/2003 | Robertson et al. ............ 711/115 |
| 6,353,561 | B1 | 3/2002 | Funyu et al. ................ 365/195 | 6,659,512 | B1 | 12/2003 | Harper et al. |
| 6,356,105 | B1 | 3/2002 | Volk ...................... 326/30 | 6,664,625 | B2 | 12/2003 | Hiruma |
| 6,356,500 | B1 | 3/2002 | Cloud et al. ............... 365/226 | 6,665,224 | B1 | 12/2003 | Lehmann et al. ............ 365/222 |
| 6,362,656 | B2 | 3/2002 | Rhee ...................... 326/87 | 6,665,227 | B2 | 12/2003 | Fetzer .................... 365/229 |
| 6,363,031 | B2 | 3/2002 | Phelan ................... 365/233 | 6,668,242 | B1 | 12/2003 | Reynov et al. |

| Patent | Date | Inventor | Class |
|---|---|---|---|
| 6,674,154 B2 | 1/2004 | Minamio et al. | |
| 6,683,372 B1 | 1/2004 | Wong et al. | |
| 6,684,292 B2 | 1/2004 | Piccirillo et al. | |
| 6,690,191 B2 | 2/2004 | Wu et al. | |
| 6,697,295 B2 | 2/2004 | Farmwald et al. | 365/233 |
| 6,701,446 B2 | 3/2004 | Tsern et al. | 713/501 |
| 6,705,877 B1 | 3/2004 | Li et al. | |
| 6,708,144 B1 | 3/2004 | Merryman et al. | 703/14 |
| 6,710,430 B2 | 3/2004 | Minamio et al. | |
| 6,711,043 B2 | 3/2004 | Friedman et al. | |
| 6,713,856 B2 | 3/2004 | Tsai et al. | |
| 6,714,891 B2 | 3/2004 | Dendinger | 702/132 |
| 6,724,684 B2 | 4/2004 | Kim | 365/233 |
| 6,730,540 B2 | 5/2004 | Siniaguine | |
| 6,731,009 B1 | 5/2004 | Jones et al. | |
| 6,731,527 B2 | 5/2004 | Brown | 365/63 |
| 6,742,098 B1 | 5/2004 | Halbert et al. | |
| 6,744,687 B2 | 6/2004 | Koo et al. | 365/226 |
| 6,747,887 B2 | 6/2004 | Halbert et al. | |
| 6,751,113 B2 | 6/2004 | Bhakta et al. | |
| 6,751,696 B2 | 6/2004 | Farmwald et al. | 710/305 |
| 6,754,129 B2 | 6/2004 | Khateri et al. | 365/226 |
| 6,754,132 B2 | 6/2004 | Kyung | 365/233 |
| 6,757,751 B1 | 6/2004 | Gene | |
| 6,762,948 B2 | 7/2004 | Kyun et al. | 365/51 |
| 6,765,812 B2 | 7/2004 | Anderson | |
| 6,766,469 B2 | 7/2004 | Larson et al. | |
| 6,771,526 B2 | 8/2004 | LaBerge | |
| 6,772,359 B2 | 8/2004 | Kwak et al. | |
| 6,779,097 B2 | 8/2004 | Gillingham et al. | 711/167 |
| 6,785,767 B2 | 8/2004 | Coulson | 711/112 |
| 6,791,877 B2 | 9/2004 | Miura et al. | 365/185 |
| 6,795,899 B2 | 9/2004 | Dodd et al. | 711/137 |
| 6,795,906 B2 * | 9/2004 | Matsuda | 711/167 |
| 6,799,241 B2 | 9/2004 | Kahn et al. | 711/105 |
| 6,801,989 B2 | 10/2004 | Johnson et al. | 711/167 |
| 6,807,598 B2 | 10/2004 | Farmwald et al. | 710/305 |
| 6,807,655 B1 | 10/2004 | Rehani et al. | 716/4 |
| 6,816,991 B2 | 11/2004 | Sanghani | 714/733 |
| 6,819,602 B2 | 11/2004 | Seo et al. | 365/193 |
| 6,819,617 B2 | 11/2004 | Hwang et al. | 365/222 |
| 6,820,163 B1 | 11/2004 | McCall et al. | 710/310 |
| 6,820,169 B2 | 11/2004 | Wilcox et al. | 711/105 |
| 6,826,104 B2 | 11/2004 | Kawaguchi et al. | 365/222 |
| 6,839,290 B2 | 1/2005 | Ahmad et al. | 365/193 |
| 6,844,754 B2 | 1/2005 | Yamagata | |
| 6,845,027 B2 | 1/2005 | Mayer et al. | |
| 6,845,055 B1 | 1/2005 | Koga et al. | 365/229 |
| 6,847,582 B2 | 1/2005 | Pan | 365/233 |
| 6,850,449 B2 | 2/2005 | Takahashi | 365/222 |
| 6,862,202 B2 | 3/2005 | Schaefer | |
| 6,862,249 B2 | 3/2005 | Kyung | 365/233 |
| 6,862,653 B1 | 3/2005 | Dodd et al. | 711/105 |
| 6,873,534 B2 | 3/2005 | Bhakta et al. | |
| 6,878,570 B2 | 4/2005 | Lyu et al. | |
| 6,894,933 B2 | 5/2005 | Kuzmenka et al. | 365/189.05 |
| 6,898,683 B2 | 5/2005 | Nakamura | 711/167 |
| 6,908,314 B2 | 6/2005 | Brown | 439/68 |
| 6,912,778 B2 | 7/2005 | Ahn et al. | 29/852 |
| 6,914,786 B1 | 7/2005 | Paulsen et al. | |
| 6,917,219 B2 | 7/2005 | New | 326/41 |
| 6,922,371 B2 | 7/2005 | Takahashi et al. | 365/227 |
| 6,930,900 B2 | 8/2005 | Bhakta et al. | |
| 6,930,903 B2 | 8/2005 | Bhakta et al. | |
| 6,938,119 B2 | 8/2005 | Kohn et al. | 711/105 |
| 6,943,450 B2 | 9/2005 | Fee et al. | |
| 6,944,748 B2 | 9/2005 | Sanches et al. | |
| 6,947,341 B2 | 9/2005 | Stubbs et al. | |
| 6,951,982 B2 | 10/2005 | Chye et al. | |
| 6,952,794 B2 | 10/2005 | Lu | |
| 6,961,281 B2 | 11/2005 | Wong et al. | 365/230.03 |
| 6,968,416 B2 | 11/2005 | Moy | 710/310 |
| 6,968,419 B1 | 11/2005 | Holman | 711/5 |
| 6,970,968 B1 | 11/2005 | Holman | 711/5 |
| 6,980,021 B1 | 12/2005 | Srivastava et al. | 326/30 |
| 6,986,118 B2 | 1/2006 | Dickman | 716/8 |
| 6,992,501 B2 | 1/2006 | Rapport | |
| 6,992,950 B2 | 1/2006 | Foss et al. | 365/233 |
| 7,000,062 B2 | 2/2006 | Perego et al. | 711/5 |
| 7,003,618 B2 | 2/2006 | Perego et al. | 711/5 |
| 7,003,639 B2 | 2/2006 | Tsern et al. | 711/154 |
| 7,007,095 B2 | 2/2006 | Chen et al. | |
| 7,007,175 B2 | 2/2006 | Chang et al. | 713/300 |
| 7,010,642 B2 | 3/2006 | Perego et al. | 711/5 |
| 7,010,736 B1 | 3/2006 | Teh et al. | 714/733 |
| 7,024,518 B2 | 4/2006 | Halbert et al. | 711/115 |
| 7,026,708 B2 | 4/2006 | Cady et al. | |
| 7,028,215 B2 | 4/2006 | Depew et al. | |
| 7,028,234 B2 | 4/2006 | Huckaby et al. | 714/710 |
| 7,033,861 B1 | 4/2006 | Partridge et al. | |
| 7,035,150 B2 | 4/2006 | Streif et al. | 365/194 |
| 7,043,599 B1 | 5/2006 | Ware et al. | 711/106 |
| 7,043,611 B2 | 5/2006 | McClannahan et al. | |
| 7,045,396 B2 | 5/2006 | Crowley et al. | |
| 7,045,901 B2 | 5/2006 | Lin et al. | |
| 7,046,538 B2 | 5/2006 | Kinsley et al. | |
| 7,053,470 B1 | 5/2006 | Sellers et al. | |
| 7,053,478 B2 | 5/2006 | Roper et al. | |
| 7,058,776 B2 | 6/2006 | Lee | 711/167 |
| 7,058,863 B2 | 6/2006 | Kouchi et al. | 714/718 |
| 7,061,784 B2 | 6/2006 | Jakobs et al. | |
| 7,061,823 B2 | 6/2006 | Faue et al. | 365/230.08 |
| 7,066,741 B2 | 6/2006 | Burns et al. | |
| 7,075,175 B2 | 7/2006 | Kazi et al. | 257/678 |
| 7,079,396 B2 | 7/2006 | Gates et al. | |
| 7,079,441 B1 | 7/2006 | Partsch et al. | 365/226 |
| 7,079,446 B2 | 7/2006 | Murtagh et al. | 365/233 |
| 7,085,152 B2 | 8/2006 | Ellis et al. | 365/149 |
| 7,085,941 B2 | 8/2006 | Li | 713/300 |
| 7,089,438 B2 | 8/2006 | Raad | 713/322 |
| 7,093,101 B2 | 8/2006 | Aasheim et al. | 711/207 |
| 7,103,730 B2 | 9/2006 | Saxena et al. | 711/156 |
| 7,110,322 B2 | 9/2006 | Farmwald et al. | |
| 7,119,428 B2 | 10/2006 | Tanie et al. | |
| 7,120,727 B2 | 10/2006 | Lee et al. | 711/5 |
| 7,126,399 B1 | 10/2006 | Lee | 327/261 |
| 7,127,567 B2 | 10/2006 | Ramakrishnan et al. | |
| 7,133,960 B1 | 11/2006 | Thompson et al. | 711/5 |
| 7,136,978 B2 | 11/2006 | Miura et al. | 711/165 |
| 7,138,823 B2 | 11/2006 | Janzen et al. | |
| 7,149,145 B2 | 12/2006 | Kim et al. | 365/233 |
| 7,149,824 B2 | 12/2006 | Johnson | 710/35 |
| 7,173,863 B2 | 2/2007 | Conley et al. | 365/189 |
| 7,200,021 B2 | 4/2007 | Raghuram | 365/51 |
| 7,205,789 B1 | 4/2007 | Karabatsos | 326/30 |
| 7,210,059 B2 | 4/2007 | Jeddeloh | |
| 7,215,561 B2 | 5/2007 | Park et al. | |
| 7,218,566 B1 | 5/2007 | Totolos, Jr. et al. | |
| 7,224,595 B2 | 5/2007 | Dreps et al. | 365/63 |
| 7,228,264 B2 | 6/2007 | Barrenscheen et al. | 703/23 |
| 7,231,562 B2 | 6/2007 | Ohlhoff et al. | |
| 7,233,541 B2 | 6/2007 | Yamamoto et al. | 365/230.03 |
| 7,234,081 B2 | 6/2007 | Nguyen et al. | |
| 7,243,185 B2 | 7/2007 | See et al. | |
| 7,245,541 B2 | 7/2007 | Janzen | 365/198 |
| 7,254,036 B2 | 8/2007 | Pauley et al. | 361/721 |
| 7,266,639 B2 | 9/2007 | Raghuram | 711/115 |
| 7,269,042 B2 | 9/2007 | Kinsley et al. | 365/52 |
| 7,269,708 B2 | 9/2007 | Ware | 711/203 |
| 7,274,583 B2 | 9/2007 | Park et al. | |
| 7,277,333 B2 | 10/2007 | Schaefer | |
| 7,286,436 B2 | 10/2007 | Bhakta et al. | 365/230 |
| 7,289,386 B2 | 10/2007 | Bhakta et al. | 365/230 |
| 7,296,754 B2 | 11/2007 | Nishizawa et al. | 235/492 |
| 7,299,330 B2 | 11/2007 | Gillingham et al. | 711/167 |
| 7,302,598 B2 | 11/2007 | Suzuki et al. | |
| 7,307,863 B2 | 12/2007 | Yen et al. | 365/63 |
| 7,317,250 B2 | 1/2008 | Koh et al. | |
| 7,337,293 B2 | 2/2008 | Brittain et al. | |
| 7,363,422 B2 | 4/2008 | Perego et al. | 711/105 |
| 7,366,947 B2 | 4/2008 | Gower et al. | |
| 7,379,316 B2 | 5/2008 | Rajan | 365/63 |
| 7,386,656 B2 | 6/2008 | Rajan et al. | 711/103 |
| 7,392,338 B2 | 6/2008 | Rajan et al. | 711/103 |
| 7,408,393 B1 | 8/2008 | Jain et al. | 327/202 |
| 7,409,492 B2 | 8/2008 | Tanaka et al. | 711/103 |
| 7,414,917 B2 | 8/2008 | Ruckerbauer et al. | |
| 7,428,644 B2 | 9/2008 | Jeddeloh et al. | |

| Patent Number | Date | Inventor(s) | Class |
|---|---|---|---|
| 7,437,579 B2 | 10/2008 | Jeddeloh et al. | 713/300 |
| 7,441,064 B2 | 10/2008 | Gaskins | |
| 7,457,122 B2 | 11/2008 | Lai et al. | |
| 7,464,225 B2 | 12/2008 | Tsern | 711/115 |
| 7,472,220 B2 | 12/2008 | Rajan et al. | 711/103 |
| 7,474,576 B2 | 1/2009 | Co et al. | |
| 7,480,147 B2 | 1/2009 | Hoss et al. | |
| 7,480,774 B2 | 1/2009 | Ellis et al. | |
| 7,496,777 B2 | 2/2009 | Kapil | 713/324 |
| 7,515,453 B2 | 4/2009 | Rajan | 365/63 |
| 7,532,537 B2 | 5/2009 | Solomon et al. | 365/230 |
| 7,539,800 B2 | 5/2009 | Dell et al. | |
| 7,573,136 B2 | 8/2009 | Jiang et al. | |
| 7,580,312 B2 | 8/2009 | Rajan et al. | |
| 7,581,121 B2 | 8/2009 | Barth et al. | |
| 7,581,127 B2* | 8/2009 | Rajan et al. | 713/320 |
| 7,590,796 B2 | 9/2009 | Rajan et al. | |
| 7,599,205 B2 | 10/2009 | Rajan | |
| 7,606,245 B2 | 10/2009 | Ma et al. | |
| 7,609,567 B2 | 10/2009 | Rajan et al. | |
| 7,613,880 B2 | 11/2009 | Miura et al. | |
| 7,619,912 B2 | 11/2009 | Bhakta et al. | |
| 7,724,589 B2 | 5/2010 | Rajan et al. | |
| 7,730,338 B2 | 6/2010 | Rajan et al. | |
| 7,761,724 B2 | 7/2010 | Rajan et al. | |
| 7,934,070 B2 | 4/2011 | Brittain et al. | |
| 7,990,797 B2 | 8/2011 | Moshayedi et al. | |
| 2001/0000822 A1 | 5/2001 | Dell et al. | 711/170 |
| 2001/0003198 A1 | 6/2001 | Wu | |
| 2001/0011322 A1 | 8/2001 | Stolt et al. | |
| 2001/0019509 A1 | 9/2001 | Aho et al. | |
| 2001/0021106 A1 | 9/2001 | Weber et al. | |
| 2001/0021137 A1 | 9/2001 | Kai et al. | |
| 2001/0046129 A1 | 11/2001 | Broglia et al. | |
| 2001/0046163 A1* | 11/2001 | Yanagawa | 365/194 |
| 2001/0054135 A1* | 12/2001 | Matsuda | 711/167 |
| 2002/0002662 A1 | 1/2002 | Olarig et al. | |
| 2002/0004897 A1 | 1/2002 | Kao et al. | |
| 2002/0015340 A1 | 2/2002 | Batinovich | |
| 2002/0019961 A1 | 2/2002 | Blodgett | 714/718 |
| 2002/0034068 A1 | 3/2002 | Weber et al. | |
| 2002/0038405 A1 | 3/2002 | Leddige et al. | 711/115 |
| 2002/0041507 A1 | 4/2002 | Woo et al. | 365/51 |
| 2002/0051398 A1 | 5/2002 | Mizugaki | 365/222 |
| 2002/0060945 A1 | 5/2002 | Ikeda | |
| 2002/0060948 A1 | 5/2002 | Chang et al. | |
| 2002/0064073 A1 | 5/2002 | Chien | 365/200 |
| 2002/0064083 A1 | 5/2002 | Ryu et al. | 365/233 |
| 2002/0089831 A1 | 7/2002 | Forthun | |
| 2002/0089970 A1 | 7/2002 | Asada et al. | |
| 2002/0094671 A1 | 7/2002 | Distefano et al. | |
| 2002/0121650 A1 | 9/2002 | Minamio et al. | |
| 2002/0121670 A1 | 9/2002 | Minamio et al. | |
| 2002/0124195 A1 | 9/2002 | Nizar | 713/320 |
| 2002/0129204 A1 | 9/2002 | Leighnor et al. | |
| 2002/0145900 A1 | 10/2002 | Schaefer | 365/52 |
| 2002/0165706 A1 | 11/2002 | Raynham | 703/25 |
| 2002/0167092 A1 | 11/2002 | Fee et al. | |
| 2002/0172024 A1 | 11/2002 | Hui et al. | |
| 2002/0174274 A1 | 11/2002 | Wu et al. | 710/100 |
| 2002/0184438 A1 | 12/2002 | Usui | 711/106 |
| 2003/0002262 A1 | 1/2003 | Benisek et al. | 361/728 |
| 2003/0011993 A1 | 1/2003 | Summers et al. | |
| 2003/0016550 A1 | 1/2003 | Yoo et al. | |
| 2003/0021175 A1 | 1/2003 | Tae Kwak | 365/219 |
| 2003/0026155 A1 | 2/2003 | Yamagata | |
| 2003/0026159 A1 | 2/2003 | Frankowsky et al. | |
| 2003/0035312 A1 | 2/2003 | Halbert et al. | |
| 2003/0039158 A1 | 2/2003 | Horiguchi et al. | |
| 2003/0041295 A1 | 2/2003 | Hou et al. | |
| 2003/0061458 A1 | 3/2003 | Wilcox et al. | 711/167 |
| 2003/0061459 A1 | 3/2003 | Aboulenein et al. | |
| 2003/0083855 A1 | 5/2003 | Fukuyama | |
| 2003/0088743 A1 | 5/2003 | Rader | |
| 2003/0093614 A1 | 5/2003 | Kohn et al. | 711/105 |
| 2003/0101392 A1 | 5/2003 | Lee | 714/718 |
| 2003/0105932 A1 | 6/2003 | David et al. | 711/167 |
| 2003/0117875 A1 | 6/2003 | Lee et al. | 365/226 |
| 2003/0123389 A1 | 7/2003 | Russell et al. | |
| 2003/0126338 A1 | 7/2003 | Dodd et al. | 710/305 |
| 2003/0127737 A1 | 7/2003 | Takahashi | |
| 2003/0131160 A1 | 7/2003 | Hampel et al. | 710/22 |
| 2003/0145163 A1 | 7/2003 | Seo et al. | 711/106 |
| 2003/0158995 A1 | 8/2003 | Lee et al. | 711/105 |
| 2003/0164539 A1 | 9/2003 | Yau | |
| 2003/0164543 A1 | 9/2003 | Kheng Lee | |
| 2003/0182513 A1 | 9/2003 | Dodd et al. | 711/137 |
| 2003/0183934 A1 | 10/2003 | Barrett | |
| 2003/0189868 A1 | 10/2003 | Riesenman et al. | 365/226 |
| 2003/0189870 A1 | 10/2003 | Wilcox | 365/233 |
| 2003/0191888 A1 | 10/2003 | Klein | 711/105 |
| 2003/0191915 A1 | 10/2003 | Saxena et al. | 711/160 |
| 2003/0200382 A1 | 10/2003 | Wells et al. | 711/106 |
| 2003/0200474 A1 | 10/2003 | Li | 713/320 |
| 2003/0205802 A1 | 11/2003 | Segaram et al. | |
| 2003/0206476 A1 | 11/2003 | Joo | |
| 2003/0217303 A1 | 11/2003 | Chua-Eoan et al. | |
| 2003/0223290 A1 | 12/2003 | Park et al. | 365/200 |
| 2003/0227798 A1 | 12/2003 | Pax | 365/189.12 |
| 2003/0229821 A1 | 12/2003 | Ma | 714/8 |
| 2003/0230801 A1 | 12/2003 | Jiang et al. | |
| 2003/0231540 A1 | 12/2003 | Lazar et al. | |
| 2003/0231542 A1 | 12/2003 | Zaharinova-Papazova et al. | 365/226 |
| 2003/0234664 A1 | 12/2003 | Yamagata | |
| 2004/0016994 A1 | 1/2004 | Huang | |
| 2004/0027902 A1 | 2/2004 | Ooishi et al. | |
| 2004/0034732 A1 | 2/2004 | Valin et al. | 711/4 |
| 2004/0034755 A1 | 2/2004 | LaBerge et al. | |
| 2004/0037133 A1 | 2/2004 | Park et al. | 365/202 |
| 2004/0042503 A1 | 3/2004 | Shaeffer et al. | |
| 2004/0044808 A1 | 3/2004 | Salmon et al. | 710/8 |
| 2004/0047228 A1 | 3/2004 | Chen | 365/232 |
| 2004/0057317 A1 | 3/2004 | Schaefer | |
| 2004/0064647 A1 | 4/2004 | DeWhitt et al. | 711/135 |
| 2004/0064767 A1 | 4/2004 | Huckaby et al. | 714/710 |
| 2004/0083324 A1 | 4/2004 | Rabinovitz et al. | |
| 2004/0088475 A1 | 5/2004 | Streif et al. | 711/105 |
| 2004/0100837 A1 | 5/2004 | Lee | |
| 2004/0117723 A1 | 6/2004 | Foss | 714/805 |
| 2004/0123173 A1 | 6/2004 | Emberling et al. | 714/733 |
| 2004/0125635 A1 | 7/2004 | Kuzmenka | |
| 2004/0133736 A1 | 7/2004 | Kyung | 711/105 |
| 2004/0133758 A1* | 7/2004 | Matsuda | 711/167 |
| 2004/0139359 A1 | 7/2004 | Samson et al. | 713/320 |
| 2004/0145963 A1 | 7/2004 | Byon | 365/233 |
| 2004/0151038 A1 | 8/2004 | Ruckerbauer et al. | |
| 2004/0174765 A1 | 9/2004 | Seo et al. | 365/233 |
| 2004/0177079 A1 | 9/2004 | Gluhovsky et al. | 707/100 |
| 2004/0178824 A1 | 9/2004 | Pan | |
| 2004/0184324 A1 | 9/2004 | Pax | 365/189.12 |
| 2004/0186956 A1 | 9/2004 | Perego et al. | 711/115 |
| 2004/0188704 A1 | 9/2004 | Halbert et al. | 257/145 |
| 2004/0195682 A1 | 10/2004 | Kimura | |
| 2004/0196732 A1 | 10/2004 | Lee | 365/233 |
| 2004/0205433 A1 | 10/2004 | Gower et al. | |
| 2004/0208173 A1 | 10/2004 | Di Gregorio | 370/360 |
| 2004/0225858 A1 | 11/2004 | Brueggen | |
| 2004/0228166 A1 | 11/2004 | Braun et al. | |
| 2004/0228196 A1 | 11/2004 | Kwak et al. | |
| 2004/0228203 A1 | 11/2004 | Koo | 365/233 |
| 2004/0230932 A1 | 11/2004 | Dickmann | 716/10 |
| 2004/0236877 A1 | 11/2004 | Burton | |
| 2004/0250989 A1 | 12/2004 | Im et al. | |
| 2004/0256638 A1 | 12/2004 | Perego et al. | 257/200 |
| 2004/0257847 A1 | 12/2004 | Matsui et al. | |
| 2004/0257857 A1 | 12/2004 | Yamamoto et al. | |
| 2004/0260957 A1 | 12/2004 | Jeddeloh et al. | 713/300 |
| 2004/0264255 A1 | 12/2004 | Royer | 365/189.01 |
| 2004/0268161 A1 | 12/2004 | Ross | 713/300 |
| 2005/0018495 A1 | 1/2005 | Bhakta et al. | 365/19 |
| 2005/0021874 A1 | 1/2005 | Georgiou et al. | 709/250 |
| 2005/0024963 A1 | 2/2005 | Jakobs et al. | |
| 2005/0027928 A1 | 2/2005 | Avraham et al. | 711/103 |
| 2005/0028038 A1 | 2/2005 | Pomaranski et al. | 714/42 |
| 2005/0034004 A1 | 2/2005 | Bunker et al. | |
| 2005/0036350 A1 | 2/2005 | So et al. | |
| 2005/0041504 A1 | 2/2005 | Perego et al. | |

| Publication No. | Date | Inventor | Class |
|---|---|---|---|
| 2005/0044303 A1 | 2/2005 | Perego et al. | 711/5 |
| 2005/0044305 A1 | 2/2005 | Jakobs et al. | 711/105 |
| 2005/0047192 A1 | 3/2005 | Matsui et al. | 365/145 |
| 2005/0071543 A1 | 3/2005 | Ellis et al. | 711/106 |
| 2005/0078532 A1 | 4/2005 | Ruckerbauer et al. | 365/199 |
| 2005/0081085 A1 | 4/2005 | Ellis et al. | 714/5 |
| 2005/0086548 A1 | 4/2005 | Haid et al. | |
| 2005/0099834 A1 | 5/2005 | Funaba et al. | |
| 2005/0102590 A1 | 5/2005 | Norris et al. | 714/719 |
| 2005/0105318 A1 | 5/2005 | Funaba et al. | |
| 2005/0108460 A1 | 5/2005 | David | |
| 2005/0127531 A1 | 6/2005 | Tay et al. | |
| 2005/0132158 A1 | 6/2005 | Hampel et al. | 711/167 |
| 2005/0135176 A1 | 6/2005 | Ramakrishnan et al. | |
| 2005/0138267 A1 | 6/2005 | Bains et al. | 711/100 |
| 2005/0138304 A1 | 6/2005 | Ramakrishnan et al. | |
| 2005/0139977 A1 | 6/2005 | Nishio et al. | |
| 2005/0141199 A1 | 6/2005 | Chiou et al. | 361/704 |
| 2005/0149662 A1 | 7/2005 | Perego et al. | 711/5 |
| 2005/0152212 A1 | 7/2005 | Yang et al. | 365/233 |
| 2005/0156934 A1 | 7/2005 | Perego et al. | |
| 2005/0166026 A1 | 7/2005 | Ware et al. | 711/167 |
| 2005/0193163 A1 | 9/2005 | Perego et al. | 711/105 |
| 2005/0193183 A1 | 9/2005 | Barth et al. | |
| 2005/0194676 A1 | 9/2005 | Fukuda et al. | |
| 2005/0194991 A1 | 9/2005 | Dour et al. | 326/30 |
| 2005/0195629 A1 | 9/2005 | Leddige et al. | 365/51 |
| 2005/0201063 A1 | 9/2005 | Lee et al. | |
| 2005/0204111 A1 | 9/2005 | Natarajan | 711/167 |
| 2005/0207255 A1 | 9/2005 | Perego et al. | |
| 2005/0210196 A1 | 9/2005 | Perego et al. | 711/115 |
| 2005/0223179 A1 | 10/2005 | Perego et al. | 711/154 |
| 2005/0224948 A1 | 10/2005 | Lee et al. | |
| 2005/0232049 A1 | 10/2005 | Park | |
| 2005/0235119 A1 | 10/2005 | Sechrest et al. | 711/158 |
| 2005/0235131 A1 | 10/2005 | Ware | 711/203 |
| 2005/0237838 A1 | 10/2005 | Kwak et al. | 365/222 |
| 2005/0243635 A1 | 11/2005 | Schaefer | |
| 2005/0246558 A1 | 11/2005 | Ku | |
| 2005/0249011 A1 | 11/2005 | Maeda | |
| 2005/0259504 A1 | 11/2005 | Murtugh et al. | 365/233 |
| 2005/0263312 A1 | 12/2005 | Bolken et al. | |
| 2005/0265506 A1 | 12/2005 | Foss et al. | 375/376 |
| 2005/0269715 A1 | 12/2005 | Yoo | |
| 2005/0278474 A1 | 12/2005 | Perersen et al. | 711/5 |
| 2005/0281096 A1 | 12/2005 | Bhakta et al. | |
| 2005/0281123 A1 | 12/2005 | Bell et al. | 365/230.08 |
| 2005/0283572 A1 | 12/2005 | Ishihara | |
| 2005/0285174 A1 | 12/2005 | Saito et al. | 257/296 |
| 2005/0286334 A1 | 12/2005 | Saito et al. | |
| 2005/0289292 A1 | 12/2005 | Morrow et al. | 711/105 |
| 2005/0289317 A1 | 12/2005 | Liou et al. | 711/170 |
| 2006/0002201 A1 | 1/2006 | Janzen | 365/191 |
| 2006/0010339 A1 | 1/2006 | Klein | 714/5 |
| 2006/0026484 A1 | 2/2006 | Hollums | 714/746 |
| 2006/0038597 A1 | 2/2006 | Becker et al. | |
| 2006/0039204 A1 | 2/2006 | Cornelius | |
| 2006/0039205 A1 | 2/2006 | Cornelius | 365/189.05 |
| 2006/0041711 A1 | 2/2006 | Miura et al. | 711/103 |
| 2006/0041730 A1 | 2/2006 | Larson | |
| 2006/0044909 A1 | 3/2006 | Kinsley et al. | 365/222 |
| 2006/0044913 A1 | 3/2006 | Klein et al. | |
| 2006/0049502 A1 | 3/2006 | Goodwin et al. | |
| 2006/0050574 A1 | 3/2006 | Streif et al. | 365/194 |
| 2006/0056244 A1 | 3/2006 | Ware | 365/194 |
| 2006/0062047 A1 | 3/2006 | Bhakta et al. | |
| 2006/0067141 A1 | 3/2006 | Perego et al. | |
| 2006/0085616 A1 | 4/2006 | Zeighami et al. | 711/167 |
| 2006/0087900 A1 | 4/2006 | Bucksch et al. | |
| 2006/0090031 A1 | 4/2006 | Kirshenbaum et al. | 711/113 |
| 2006/0090054 A1 | 4/2006 | Choi et al. | 711/167 |
| 2006/0106951 A1 | 5/2006 | Bains | 710/5 |
| 2006/0112214 A1 | 5/2006 | Yeh | 711/103 |
| 2006/0112219 A1 | 5/2006 | Chawla et al. | |
| 2006/0117152 A1 | 6/2006 | Amidi et al. | 711/154 |
| 2006/0117160 A1 | 6/2006 | Jackson et al. | 711/170 |
| 2006/0118933 A1 | 6/2006 | Haba | |
| 2006/0120193 A1 | 6/2006 | Casper | |
| 2006/0123265 A1 | 6/2006 | Ruckerbauer et al. | |
| 2006/0126369 A1 | 6/2006 | Raghuram | |
| 2006/0129712 A1 | 6/2006 | Raghuram | 710/52 |
| 2006/0129740 A1 | 6/2006 | Ruckerbauer et al. | |
| 2006/0129755 A1 | 6/2006 | Raghuram | 711/105 |
| 2006/0133173 A1 | 6/2006 | Jain et al. | |
| 2006/0136791 A1 | 6/2006 | Nierle | |
| 2006/0149982 A1 | 7/2006 | Vogt | 713/320 |
| 2006/0174082 A1 | 8/2006 | Bellows et al. | |
| 2006/0176744 A1 | 8/2006 | Stave | 365/194 |
| 2006/0179262 A1 | 8/2006 | Brittain et al. | |
| 2006/0179333 A1 | 8/2006 | Brittain et al. | 713/320 |
| 2006/0179334 A1 | 8/2006 | Brittain et al. | 713/320 |
| 2006/0180926 A1 | 8/2006 | Mullen et al. | |
| 2006/0181953 A1 | 8/2006 | Rotenberg et al. | |
| 2006/0195631 A1 | 8/2006 | Rajamani | |
| 2006/0198178 A1 | 9/2006 | Kinsley et al. | |
| 2006/0203590 A1 | 9/2006 | Mori et al. | |
| 2006/0206738 A1 | 9/2006 | Jeddeloh et al. | 713/320 |
| 2006/0233012 A1 | 10/2006 | Sekiguchi et al. | |
| 2006/0236165 A1 | 10/2006 | Cepulis et al. | |
| 2006/0236201 A1 | 10/2006 | Gower et al. | |
| 2006/0248261 A1 | 11/2006 | Jacob et al. | |
| 2006/0248387 A1 | 11/2006 | Nicholson et al. | 714/22 |
| 2006/0262586 A1 | 11/2006 | Solomon et al. | |
| 2006/0294295 A1 | 12/2006 | Fukuzo | 711/105 |
| 2007/0005998 A1 | 1/2007 | Jain et al. | |
| 2007/0050530 A1 | 3/2007 | Rajan | 711/5 |
| 2007/0058471 A1 | 3/2007 | Rajan et al. | 365/222 |
| 2007/0070669 A1 | 3/2007 | Tsern | |
| 2007/0088995 A1 | 4/2007 | Tsern et al. | |
| 2007/0091696 A1 | 4/2007 | Niggemeier et al. | |
| 2007/0106860 A1 | 5/2007 | Foster, Sr. et al. | 711/170 |
| 2007/0136537 A1 | 6/2007 | Doblar et al. | |
| 2007/0162700 A1 | 7/2007 | Fortin et al. | 711/118 |
| 2007/0188997 A1 | 8/2007 | Hockanson et al. | |
| 2007/0192563 A1 | 8/2007 | Rajan et al. | 711/202 |
| 2007/0195613 A1 | 8/2007 | Rajan et al. | 365/189.05 |
| 2007/0204075 A1 | 8/2007 | Rajan et al. | |
| 2007/0216445 A1 | 9/2007 | Raghavan et al. | 326/83 |
| 2007/0247194 A1 | 10/2007 | Jain | 326/87 |
| 2007/0279084 A1 | 12/2007 | Oh et al. | |
| 2007/0288683 A1 | 12/2007 | Panabaker et al. | 711/101 |
| 2007/0288686 A1 | 12/2007 | Arcedera et al. | 711/103 |
| 2007/0288687 A1 | 12/2007 | Panabaker et al. | 711/103 |
| 2008/0002447 A1 | 1/2008 | Gulachenski et al. | |
| 2008/0010435 A1 | 1/2008 | Smith et al. | |
| 2008/0025108 A1 | 1/2008 | Rajan et al. | 365/189.05 |
| 2008/0025122 A1 | 1/2008 | Schakel et al. | 365/222 |
| 2008/0025136 A1 | 1/2008 | Rajan et al. | 365/230.08 |
| 2008/0025137 A1 | 1/2008 | Rajan et al. | 365/239 |
| 2008/0027697 A1 | 1/2008 | Rajan et al. | 703/14 |
| 2008/0027702 A1 | 1/2008 | Rajan et al. | 703/21 |
| 2008/0027703 A1 | 1/2008 | Rajan et al. | 703/21 |
| 2008/0028135 A1 | 1/2008 | Rajan et al. | |
| 2008/0028136 A1 | 1/2008 | Schakel et al. | 711/106 |
| 2008/0028137 A1 | 1/2008 | Schakel et al. | |
| 2008/0031030 A1 | 2/2008 | Rajan et al. | 365/63 |
| 2008/0031072 A1 | 2/2008 | Rajan et al. | 365/227 |
| 2008/0037353 A1 | 2/2008 | Rajan et al. | 365/227 |
| 2008/0056014 A1 | 3/2008 | Rajan et al. | 365/189.03 |
| 2008/0062773 A1 | 3/2008 | Rajan et al. | 365/189.03 |
| 2008/0065820 A1 | 3/2008 | Gillingham et al. | 711/105 |
| 2008/0082763 A1 | 4/2008 | Rajan et al. | 711/154 |
| 2008/0086588 A1 | 4/2008 | Danilak et al. | |
| 2008/0089034 A1 | 4/2008 | Hoss et al. | |
| 2008/0098277 A1 | 4/2008 | Hazelzet | |
| 2008/0103753 A1 | 5/2008 | Rajan et al. | |
| 2008/0104314 A1 | 5/2008 | Rajan et al. | |
| 2008/0109206 A1 | 5/2008 | Rajan et al. | |
| 2008/0109595 A1 | 5/2008 | Rajan et al. | |
| 2008/0109597 A1 | 5/2008 | Schakel et al. | |
| 2008/0109598 A1 | 5/2008 | Schakel et al. | |
| 2008/0115006 A1 | 5/2008 | Smith et al. | 713/601 |
| 2008/0120443 A1 | 5/2008 | Rajan et al. | |
| 2008/0120458 A1 | 5/2008 | Gillingham et al. | 711/105 |
| 2008/0123459 A1 | 5/2008 | Rajan et al. | 365/227 |
| 2008/0126624 A1 | 5/2008 | Prete et al. | |
| 2008/0126687 A1 | 5/2008 | Rajan et al. | |
| 2008/0126688 A1 | 5/2008 | Rajan et al. | |

| | | | |
|---|---|---|---|
| 2008/0126689 A1 | 5/2008 | Rajan et al. | |
| 2008/0126690 A1 | 5/2008 | Rajan et al. | 711/105 |
| 2008/0126692 A1 | 5/2008 | Rajan et al. | |
| 2008/0133825 A1 | 6/2008 | Rajan et al. | |
| 2008/0155136 A1 | 6/2008 | Hishino | |
| 2008/0159027 A1 | 7/2008 | Kim | |
| 2008/0170425 A1 | 7/2008 | Rajan | |
| 2008/0195894 A1 | 8/2008 | Schreck et al. | |
| 2008/0215832 A1 | 9/2008 | Allen et al. | |
| 2008/0239857 A1 | 10/2008 | Rajan et al. | 365/227 |
| 2008/0239858 A1 | 10/2008 | Rajan et al. | 365/227 |
| 2008/0256282 A1 | 10/2008 | Guo et al. | |
| 2009/0024789 A1 | 1/2009 | Rajan et al. | |
| 2009/0024790 A1 | 1/2009 | Rajan et al. | |
| 2009/0109613 A1 | 4/2009 | Legen et al. | |
| 2009/0216939 A1 | 8/2009 | Smith et al. | |
| 2009/0285031 A1 | 11/2009 | Rajan et al. | |
| 2009/0290442 A1 | 11/2009 | Rajan | |
| 2010/0005218 A1 | 1/2010 | Gower et al. | |
| 2010/0020585 A1 | 1/2010 | Rajan | |
| 2010/0257304 A1 | 10/2010 | Rajan et al. | |
| 2010/0271888 A1 | 10/2010 | Rajan | |
| 2010/0281280 A1 | 11/2010 | Rajan et al. | |

FOREIGN PATENT DOCUMENTS

| | | |
|---|---|---|
| DE | 102004053316 | 5/2006 |
| DE | 102005036528 | 2/2007 |
| EP | 0644547 | 3/1995 |
| JP | 62121978 | 6/1987 |
| JP | 01171047 | 7/1989 |
| JP | 03-029357 | 2/1991 |
| JP | 03029357 | 2/1991 |
| JP | 03/276487 | 12/1991 |
| JP | 03286234 | 12/1991 |
| JP | 07-141870 | 6/1995 |
| JP | 08/077097 | 3/1996 |
| JP | 08077097 | 3/1996 |
| JP | 11-149775 | 6/1999 |
| JP | 2002025255 | 1/2002 |
| JP | 3304893 B2 | 5/2002 |
| JP | 2006236388 | 9/2006 |
| KR | 1020040062717 | 7/2004 |
| WO | WO 95/05676 | 2/1995 |
| WO | WO9900734 | 1/1999 |
| WO | WO00/45270 | 8/2000 |
| WO | WO01/90900 | 11/2001 |
| WO | WO01/97160 | 12/2001 |
| WO | WO2004/051645 | 6/2004 |
| WO | WO 2007002324 | 1/2007 |
| WO | WO2007/028109 | 3/2007 |
| WO | WO 2007/038225 | 4/2007 |
| WO | WO2007/095080 | 8/2007 |
| WO | WO2008063251 | 5/2008 |

OTHER PUBLICATIONS

Final Rejection from U.S. Appl. No. 11/762,010 Mailed Dec. 4, 2009.
Non-Final Rejection from U.S. Appl. No. 11/672,921 Mailed Dec. 8, 2009.
Non-Final Rejection from U.S. Appl. No. 11/672,924 Mailed Dec. 14, 2009.
Non-Final Rejection from U.S. Appl. No. 11/929,225 Mailed Dec. 14, 2009.
Non-Final Rejection from U.S. Appl. No. 11/929,261 Mailed Dec. 14, 2009.
Notice of Allowance From U.S. Appl. No. 11/611,374 Mailed Nov. 30, 2009.
Notice of Allowance From U.S. Appl. No. 11/939,432 Mailed Dec. 1, 2009.
Notice of Allowance From U.S. Appl. No. 12/111,819 Mailed Nov. 20, 2009.
Notice of Allowance From U.S. Appl. No. 12/111,828 Mailed Dec. 15, 2009.
Final Rejection From U.S. Appl. No. 11/538,041 Mailed Dec. 17, 2009.
Fang et al., W. Power Complexity Analysis of Adiabatic SRAM, 6th Int. Conference on ASIC, vol. 1, Oct. 2005, pp. 334-337.
Pavan et al., P. A Complete Model of E2PROM Memory Cells for Circuit Simulations, IEEE Transactions on Computer-Aided Design of Integrated Circuits and Systems, vol. 22, No. 8, Aug. 2003, pp. 1072-1079.
German Office Action From German Patent Application No. 11 2006 001 810.8-55 Mailed Apr. 20, 2009 (With Translation).
Non-final Office Action from U.S. Appl. No. 11/461,430 mailed on Feb. 19, 2009.
Final Office Action from U.S. Appl. No. 11/461,435 mailed on Jan. 28, 2009.
Non-final Office Action from U.S. Appl. No. 11/461,437 mailed on Jan. 26, 2009.
Non-Final Office Action from U.S. Appl. No. 11/939,432 mailed on Feb. 6, 2009.
Wu et al., "eNVy: A Non-Volatile, Main Memory Storage System," ASPLOS-VI Proceedings—Sixth International Conference on Architectural Support for Programming Languages and Operating Systems, San Jose, California, Oct. 4-7, 1994. SIGARCH Computer Architecture News 22(Special Issue Oct. 1994).
German Office Action From German Patent Application No. 11 2006 002 300.4-55 Mailed Jun. 5, 2009 (With Translation).
Non-Final Office Action From U.S. Appl. No. 11/461,430 Mailed Feb. 19, 2009.
Final Office Action From U.S. Appl. No. 11/461,435 Mailed Jan. 28, 2009.
Non-Final Office Action From U.S. Appl. No. 11/461,437 Mailed Jan. 26, 2009.
Non-Final Office Action From U.S. Appl. No. 11/461,441 Mailed Apr. 2, 2009.
Non-Final Office Action From U.S. Appl. No. 11/611,374 Mailed Mar. 23, 2009.
Non-Final Office Action From U.S. Appl. No. 11/762,010 Mailed Mar. 20, 2009.
Non-Final Office Action From U.S. Appl. No. 11/939,432 Mailed Feb. 6, 2009.
Non-Final Office Action From U.S. Appl. No. 12/111,819 Mailed Apr. 27, 2009.
Non-Final Office Action From U.S. Appl. No. 12/111,828 Mailed Apr. 17, 2009.
Great Britain Office Action from GB Patent Application No. GB0800734.6 Mailed Mar. 1, 2010.
Final Office Action from U.S. Appl. No. 11/461,420 Mailed Apr. 28, 2010.
Notice of Allowance from U.S. Appl. No. 11/553,372 Mailed Mar. 12, 2010.
Notice of Allowance from U.S. Appl. No. 11/553,399 Mailed Mar. 22, 2010.
Non-Final Office Action from U.S. Appl. No. 11/588,739 Mailed Dec. 29, 2009.
Notice of Allowance from U.S. Appl. No. 11/611,374 Mailed Apr. 5, 2010.
Non-Final Office Action from U.S. Appl. No. 11/828,181 Mailed Mar. 2, 2010.
Non-Final Office Action from U.S. Appl. No. 11/828,182 Mailed Mar. 29, 2010.
Final Office Action from U.S. Appl. No. 11/858,518 Mailed Apr. 21, 2010.
Non-Final Office Action from U.S. Appl. No. 11/929,432 Mailed Jan. 14, 2010.
Non-Final Office Action from U.S. Appl. No. 11/929,571 Mailed Mar. 3, 2010.
Non-Final Office Action from U.S. Appl. No. 11/929,631 Mailed Mar. 3, 2010.
Non-Final Office Action from U.S. Appl. No. 11/929,636 Mailed Mar. 9, 2010.
Non-Final Office Action from U.S. Appl. No. 11/929,655 Mailed Mar. 3, 2010.
Non-Final Office Action from U.S. Appl. No. 11/939,432 Mailed Apr. 12, 2010.
Notice of Allowance from U.S. Appl. No. 12/111,819 Mailed Mar. 10, 2010.
Non-Final Office Action from U.S. Appl. No. 12/507,682 Mailed Mar. 8, 2010.

Kellerbauer "Die Schnelle Million," with translation, "The quick million."

Wu et al., "eNVy: A Non-Volatile, Main Memory Storage System," to appear in ASPLOS VI.

"Using Two Chip Selects to Enable Quad Rank," IP.com PriorArtDatabase, copyright IP.com, Inc. 2004.

"BIOS and Kernel Developer's Guide (BKDG) for AMD Family 10h Processors," AMD, 31116 Rev 3.00, Sep. 7, 2007.

Skerlj et al., "Buffer Device for Memory Modules (DIMM)" Qimonda 2006, p. 1.

Written Opinion from PCT Application No. PCT/US06/24360 mailed on Jan. 8, 2007.

Preliminary Report on Patentability from PCT Application No. PCT/US06/24360 mailed on Jan. 10, 2008.

Written Opinion from International PCT Application No. PCT/US06/34390 mailed on Nov. 21, 2007.

International Search Report from PCT Application No. PCT/US06/34390 mailed on Nov. 21, 2007.

Office Action from U.S. Appl. No. 11/461,427 mailed on Sep. 5, 2008.

Final Office Action from U.S. Appl. No. 11/461,430 mailed on Sep. 8, 2008.

Notice of Allowance from U.S. Appl. No. 11/474,075 mailed on Nov. 26, 2008.

Office Action from U.S. Appl. No. 11/474,076 mailed on Nov. 3, 2008.

Office Action from U.S. Appl. No. 11/524,811 mailed on Sep. 17, 2008.

Non-Final Office Action from U.S. Appl. No. 11/461,420 Dated Jul. 23, 2009.

Notice of Allowance from U.S. Appl. No. 11/461,430 Dated Sep. 9, 2009.

Non-Final Office Action from U.S. Appl. No. 11/461,435 Dated Aug. 5, 2009.

Non-Final Office Action from U.S. Appl. No. 11/515,167 Dated Sep. 25, 2009.

Non-Final Office Action from U.S. Appl. No. 11/515,223 Dated Sep. 22, 2009.

Non-Final Office Action from U.S. Appl. No. 11/538,041 Dated Jun. 10, 2009.

Non-Final Office Action from U.S. Appl. No. 11/553,372 Dated Jun. 25, 2009.

Notice of Allowance from U.S. Appl. No. 11/553,372 Dated Sep. 30, 2009.

Non-Final Office Action from U.S. Appl. No. 11/553,390 Dated Sep. 9, 2009.

Non-Final Office Action from U.S. Appl. No. 11/553,399 Dated Jul. 7, 2009.

Notice of Allowance from U.S. Appl. No. 11/553,399 Dated Oct. 13, 2009.

Notice of Allowance from U.S. Appl. No. 11/611,374 Dated Sep. 15, 2009.

Non-Final Office Action from U.S. Appl. No. 11/702,960 Dated Sep. 25, 2009.

Non-Final Office Action from U.S. Appl. No. 11/702,981 Dated Aug. 19, 2009.

Non-Final Office Action from U.S. Appl. No. 11/762,013 Dated Jun. 5, 2009.

Non-Final Office Action from U.S. Appl. No. 11/763,365 Dated Oct. 28, 2009.

Non-Final Office Action from U.S. Appl. No. 11/858,518 Dated Aug. 14, 2009.

Non-Final Office Action from U.S. Appl. No. 11/929,500 Dated Oct. 13, 2009.

Notice of Allowance from U.S. Appl. No. 11/939,432 Dated Sep. 24, 2009.

Non-Final Office Action from U.S. Appl. No. 11/941,589 Dated Oct. 1, 2009.

Supplemental European Search Report and Search Opinion issued Sep. 21, 2009 in European Application No. 07870726.2, 8 pp.

Wu et al., "eNVy: A Non-Volatile, Main Memory Storage System", ASPLOS-VI Proceedings, Oct. 4-7, 1994, pp. 86-97.

Buffer Device for Memory Modules (DIMM), IP.com Prior Art Database, <URL: http://ip.com/IPCOM/000144850>, Feb. 10, 2007, 1 pg.

German Office Action from German Patent Application No. 11 2006 002 300.4-55 Dated May 11, 2009 (With Translation).

Great Britain Office Action from GB Patent Application No. GB0803913.3 Dated Mar. 1, 2010.

International Preliminary Examination Report From PCT Application No. PCT/US07/016385 Dated Feb. 3, 2009.

Search Report and Written Opinion From PCT Application No. PCT/US07/03460 Dated on Feb. 14, 2008.

Final Office Action from U.S. Appl. No. 11/461,435 Dated May 13, 2010.

Final Office Action from U.S. Appl. No. 11/515,167 Dated Jun. 3, 2010.

Notice of Allowance from U.S. Appl. No. 11/515,223 Dated Jul. 30, 2010.

Notice of Allowance from U.S. Appl. No. 11/553,372 Dated Aug. 4, 2010.

Final Office Action from U.S. Appl. No. 11/553,390 Dated Jun. 24, 2010.

Notice of Allowance from U.S. Appl. No. 11/553,399 Dated Dec. 3, 2010.

Notice of Allowance from U.S. Appl. No. 11/611,374 Dated Jul. 19, 2010.

Notice of Allowance from U.S. Appl. No. 11/611,374 Dated Oct. 29, 2010.

Final Office Action from U.S. Appl. No. 11/672,921 Dated Jul. 23, 2010.

Final Office Action from U.S. Appl. No. 11/672,924 Dated Sep. 7, 2010.

Final Office Action from U.S. Appl. No. 11/702,960 Dated Jun. 21, 2010.

Non-Final Office Action from U.S. Appl. No. 11/702,981 Dated Mar. 11, 2009.

Notice of Allowance from U.S. Appl. No. 11/762,010 Dated Jul. 2, 2010.

Notice of Allowance from U.S. Appl. No. 11/762,010 Dated Oct. 22, 2010.

Notice of Allowance from U.S. Appl. No. 11/762,013 Dated Aug. 17, 2010.

Notice of Allowance from U.S. Appl. No. 11/762,013 Dated Dec. 7, 2010.

Notice of Allowance from U.S. Appl. No. 11/763,365 Dated Jun. 29, 2010.

Notice of Allowance from U.S. Appl. No. 11/763,365 Dated Oct. 20, 2010.

Non-Final Office Action from U.S. Appl. No. 11/855,805 Dated Sep. 21, 2010.

Non-Final Office Action from U.S. Appl. No. 11/858,518 Dated Sep. 8, 2010.

Final Office Action from U.S. Appl. No. 11/929,225 Dated Aug. 27, 2010.

Final Office Action from U.S. Appl. No. 11/929,261 Dated Sep. 7, 2010.

Final Office Action from U.S. Appl. No. 11/929,286 Dated Aug. 20, 2010.

Notice of Allowance from U.S. Appl. No. 11/929,320 Dated Sep. 29, 2010.

Final Office Action from U.S. Appl. No. 11/929,403 Dated Aug. 31, 2010.

Final Office Action from U.S. Appl. No. 11/929,417 Dated Aug. 31, 2010.

Final Office Action from U.S. Appl. No. 11/929,432 Dated Aug. 20, 2010.

Final Office Action from U.S. Appl. No. 11/929,450 Dated Aug. 20, 2010.

Notice of Allowance from U.S. Appl. No. 11/929,483 Dated Oct. 7, 2010.

Final Office Action from U.S. Appl. No. 11/929,500 Dated Jun. 24, 2010.

Final Office Action from U.S. Appl. No. 11/929,631 Dated Nov. 18, 2010.

Final Office Action from U.S. Appl. No. 11/929,655 Dated Nov. 22, 2010.
Notice of Allowance from U.S. Appl. No. 11/941,589 Dated Oct. 25, 2010.
Non-Final Office Action from U.S. Appl. No. 12/057,306 Dated Oct. 8, 2010.
Non-Final Office Action from U.S. Appl. No. 12/203,100 Dated Dec. 1, 2010.
Non-Final Office Action from U.S. Appl. No. 12/574,628 Dated Jun. 10, 2010.
Non-Final Office Action from U.S. Appl. No. 12/769,428 Dated Nov. 8, 2010.
Non-Final Office Action from U.S. Appl. No. 12/838,896 Dated Sep. 3, 2010.
Search Report From PCT Application No. PCT/US10/038041 Dated Aug. 23, 2010.

* cited by examiner

ADJUSTING THE TIMING OF SIGNALS ASSOCIATED WITH A MEMORY SYSTEM

RELATED APPLICATION(S)

The present application is a continuation-in-part of an application Ser. No. 11/524,811 filed Sep. 20, 2006 now U.S. Pat. No. 7,590,796, which is a continuation-in-part of an application filed Jul. 31, 2006 under application Ser. No. 11/461,439 now U.S. Pat. No. 7,580,312, which are incorporated herein by reference for all purposes. The present application claims the benefit of priority to the provisional application 60/865,627 filed Nov. 13, 2006, which is incorporated herein by reference for all purposes. Insofar as any definitions, information used for claim interpretation, etc. from the above parent/provisional application conflict with that set forth herein, such definitions, information, etc. in the present application should apply.

FIELD OF THE INVENTION

The present invention relates to memory systems and more particularly to improving memory systems.

BACKGROUND

There is a need for larger, faster, higher performance memory systems with increased and improved user features while still maintaining low power, form factor, and backward compatibility

SUMMARY

A system and method are provided for adjusting the timing of signals associated with a memory system. A memory controller is provided. Additionally, at least one memory module is provided. Further, at least one interface circuit is provided, the interface circuit capable of adjusting timing of signals associated with one or more of the memory controller and the at least one memory module.

DETAILED DESCRIPTION

Figure 1A:
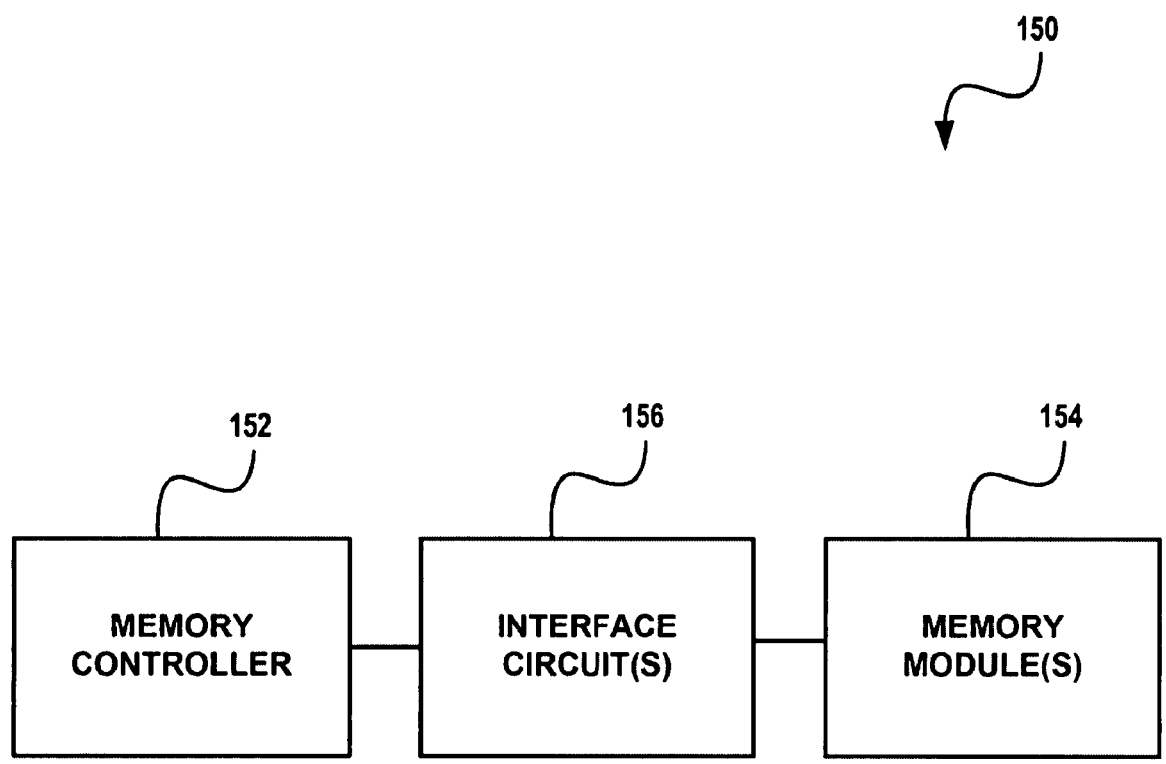
FIG. 1A depicts a memory system for adjusting the timing of signals associated with the memory system, in accordance with one embodiment.

FIG. 1A depicts a memory system 150 for adjusting the timing of signals associated with the memory system 150, in accordance with one embodiment. As shown, a memory controller 152 is provided. In the context of the present description, a memory controller refers to any device capable of sending instructions or commands, or otherwise controlling memory circuits. Additionally, at least one memory module 154 is provided. Further, at least one interface circuit 156 is provided, the interface circuit capable of adjusting timing of signals associated with one or more of the memory controller 152 and the at least one memory module 154.

The signals may be any signals associated with the memory system 150. For example, in various embodiments, the signals may include address signals, control signals, data signals, commands, etc. As an option, the timing may be adjusted based on a type of the signal (e.g. a command, etc.). As another option, the timing may be adjusted based on a sequence of commands.

In one embodiment, the adjustment of the timing of the signals may allow for the insertion of additional logic for use in the memory system 150. In this case, the additional logic may be utilized to improve performance of one or more aspects of the memory system 150. For example, in various embodiments the additional logic may be utilized to improve and/or implement reliability, accessibility and serviceability (RAS) functions, power management functions, mirroring of memory, and other various functions. As an option, the performance of the one or more aspects of the memory system may be improved without physical changes to the memory system 150.

Additionally, in one embodiment, the timing may be adjusted based on at least one timing requirement. In this case, the at least one timing requirement may be specified by at least one timing parameter at one or more interfaces included in the memory system 150. For example, in one case, the adjustment may include modifying one or more delays. Strictly as an option, the timing parameters may be modified to allow the adjusting of the timing.

More illustrative information will now be set forth regarding various optional architectures and features of different embodiments with which the foregoing framework may or may not be implemented, per the specification of a user. It should be strongly noted that the following information is set forth for illustrative purposes and should not be construed as limiting in any manner. Any of the following features may be optionally incorporated with or without the other features described.

Figure 1B:
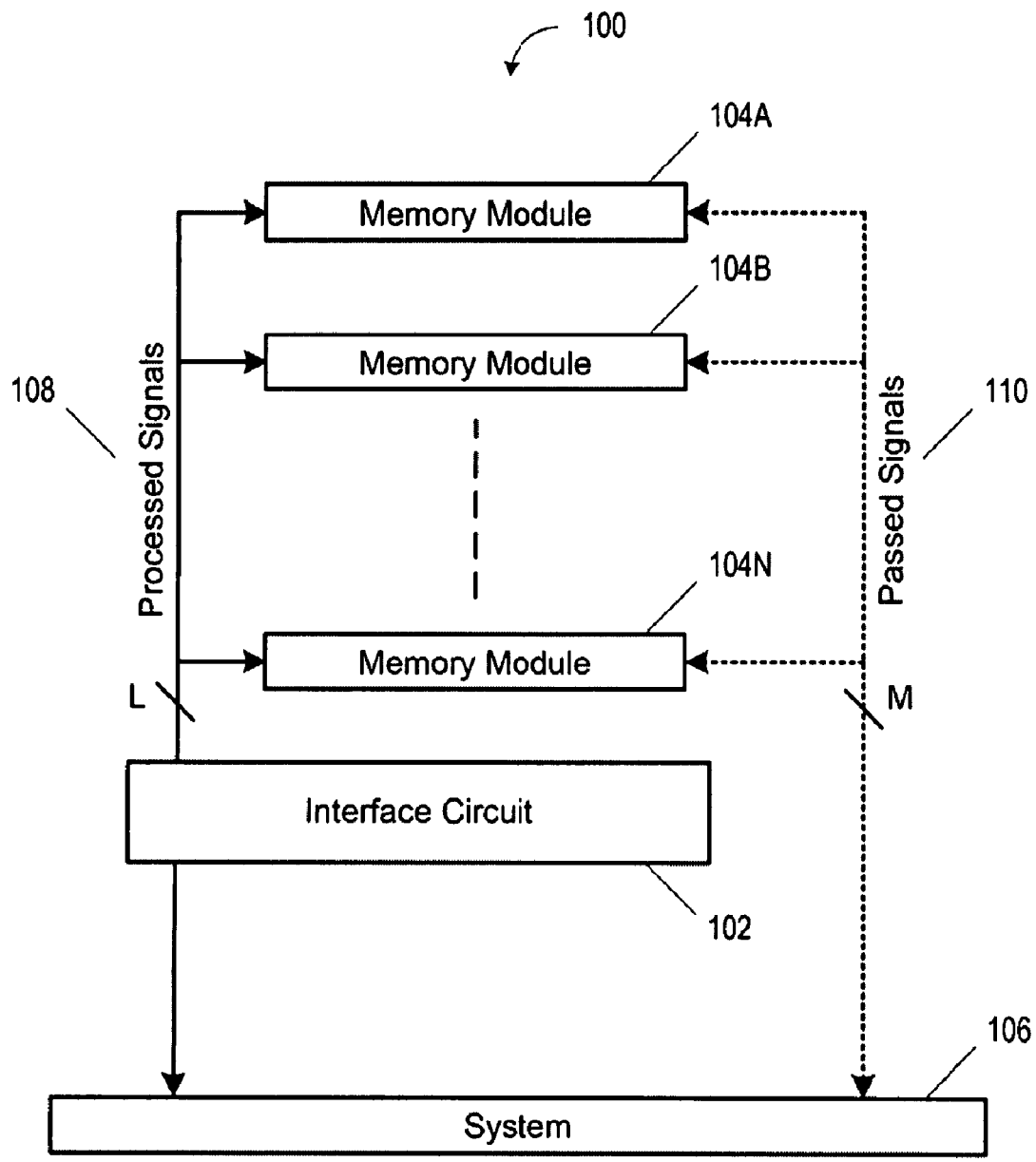
FIG. 1B depicts a memory system for adjusting the timing of signals associated with the memory system, in accordance with another embodiment.

FIG. 1B depicts a memory system 100 for adjusting the timing of signals associated with the memory system 100, in accordance with another embodiment. As an option, the present system 100 may be implemented in the context of the functionality and architecture of FIG. 1A. Of course, however, the system 100 may be implemented in any desired environment. It should also be noted that the aforementioned definitions may apply during the present description.

As shown, the memory system 100 includes an interface circuit 102 disposed electrically between a system 106 and one or more memory modules 104A-104N. Processed signals 108 between the system 106 and the memory modules 104A-104N pass through an interface circuit 102. Passed signals 110 may be routed directly between the system 106 and the memory modules 104A-104N without being routed through the interface circuit 102. The processed signals 108 are inputs or outputs to the interface circuit 102, and may be processed by the interface circuit logic to adjust the timing of address, control and/or data signals in order to that improve performance of a memory system. In one embodiment, the interface circuit 102 may adjust timing of address, control and/or data signals in order to allow insertion of additional logic that improves performance of a memory system.

Figure 1C:
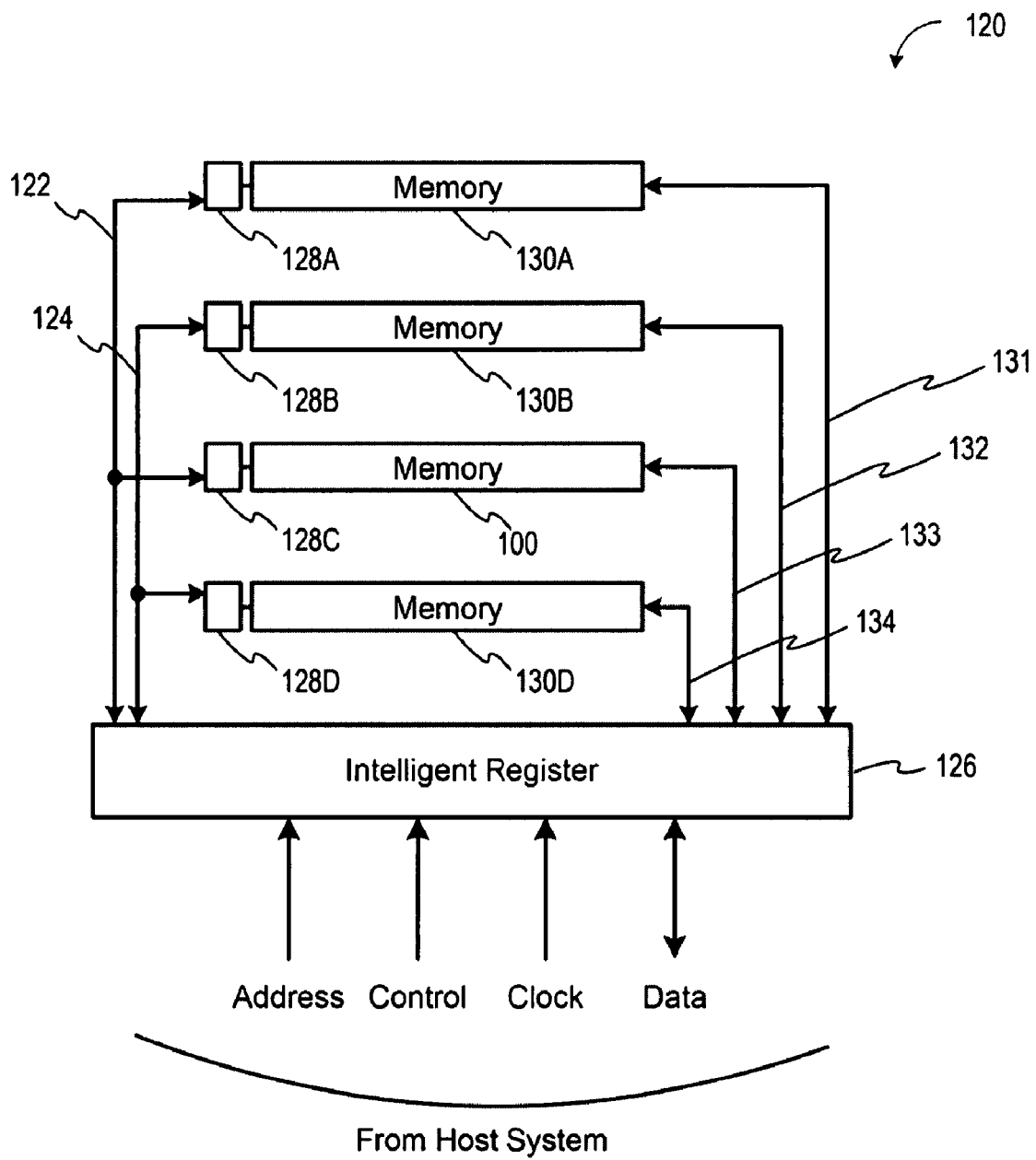
FIG. 1C depicts a memory system for adjusting the timing of signals associated with the memory system, in accordance with another embodiment.

FIG. 1C depicts a memory system 120 for adjusting the timing of signals associated with the memory system 120, in accordance with another embodiment. As an option, the present system 120 may be implemented in the context of the functionality and architecture of FIGS. 1A-1B. Of course, however, the system 100 may be implemented in any desired environment. Again, the aforementioned definitions may apply during the present description.

In operation, processed signals 122 and 124 may be processed by an intelligent register circuit 126, or by intelligent buffer circuits 128A-128D, or in some combination thereof. FIG. 1C also shows an interconnect scheme wherein signals passing between the intelligent register 126 and memory 130A-130D, whether directly or indirectly, may be routed as independent groups of signals 131-134 or a shared signal (e.g. the processed signals 122 and 124).

Figure 2:
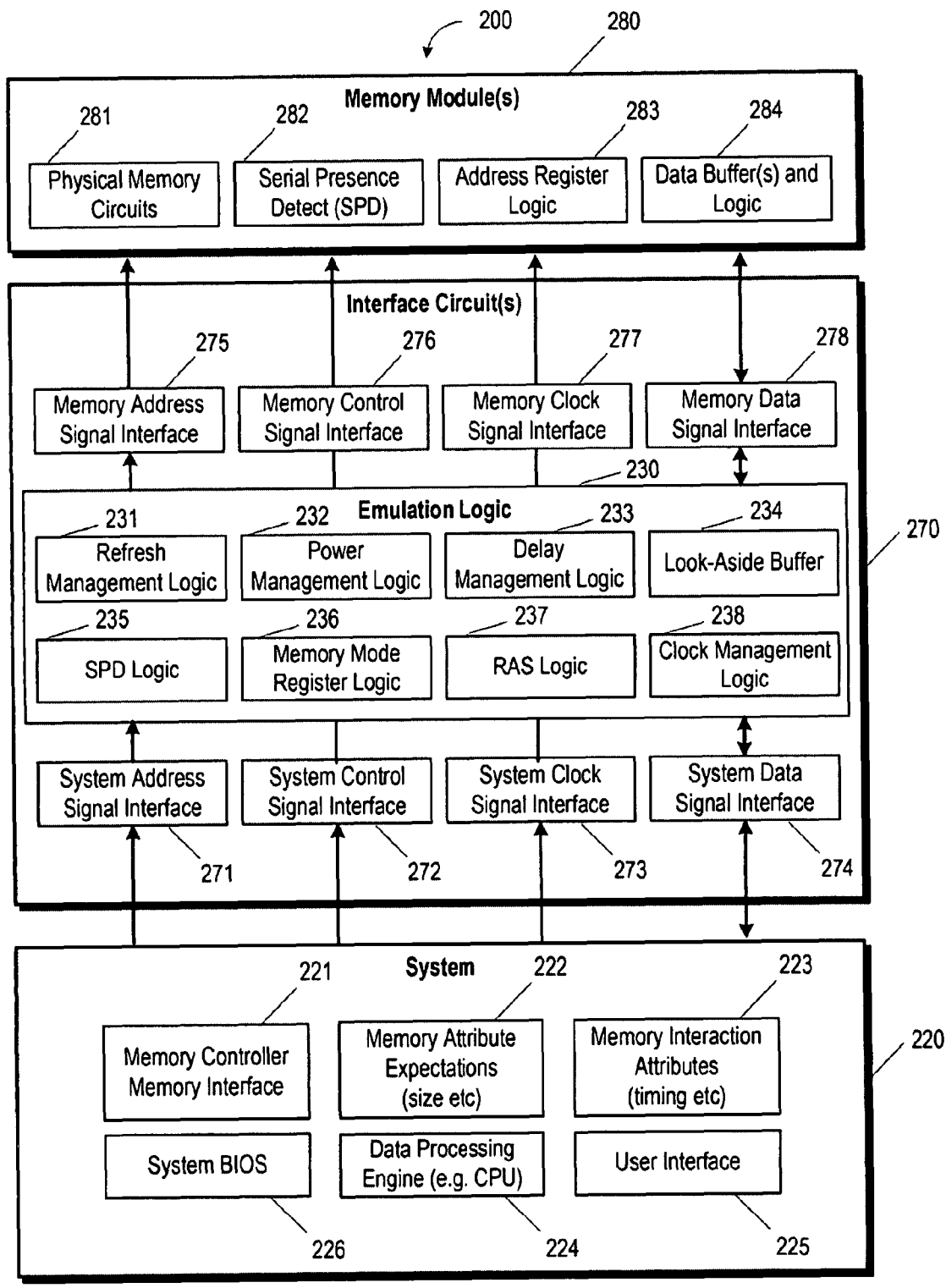
FIG. 2 depicts a system platform, in accordance with one embodiment.

FIG. 2 depicts a system platform 200, in accordance with one embodiment. As an option, the system platform 200 may be implemented in the context of the details of FIGS. 1A-1C. Of course, however, the system platform 200 may be implemented in any desired environment. Additionally, the aforementioned definitions may apply during the present description.

As shown, the system platform 200 is provided including separate components such as a system 220 (e.g. a motherboard), and memory module(s) 280 which contain memory circuits 281 [e.g. physical memory circuits, dynamic random access memory (DRAM), synchronous DRAM (SDRAM), double-data-rate (DDR) memory, DDR2, DDR3, graphics DDR (GDDR), etc.]. In one embodiment, the memory modules 280 may include dual-in-line memory modules (DIMMs). As an option, the computer platform 200 may be configured to include the physical memory circuits 281 connected to the system 220 by way of one or more sockets.

In one embodiment, a memory controller 221 may be designed to the specifics of various standards. For example, the standard defining the interfaces may be based on Joint Electron Device Engineering Council (JEDEC) specifications compliant to semiconductor memory (e.g. DRAM, SDRAM, DDR2, DDR3, GDDR etc.). The specifics of these standards address physical interconnection and logical capabilities.

As shown further, the system 220 may include logic for retrieval and storage of external memory attribute expectations 222, memory interaction attributes 223, a data processing unit 224, various mechanisms to facilitate a user interface 225, and a system basic Input/Output System (BIOS) 226.

In various embodiments, the system 220 may include a system BIOS program capable of interrogating the physical memory circuits 281 to retrieve and store memory attributes. Further, in external memory embodiments, JEDEC-compliant DIMMs may include an electrically erasable programmable read-only memory (EEPROM) device known as a Serial Presence Detect (SPD) 282 where the DIMM memory attributes are stored. It is through the interaction of the system BIOS 226 with the SPD 282 and the interaction of the system BIOS 226 with physical attributes of the physical memory circuits 281 that memory attribute expectations of the system 220 and memory interaction attributes become known to the system 220. Also optionally included on the memory module 280 are address register logic 283 (i.e. JEDEC standard register, register, etc.) and data buffer(s) and logic 284. The functions of the registers 283 and the data buffers 284 may be utilized to isolate and buffer the physical memory circuits 281, reducing the electrical load that must be driven.

In various embodiments, the computer platform 200 may include one or more interface circuits 270 electrically disposed between the system 220 and the physical memory circuits 281. The interface circuits 270 may be physically separate from the memory module 280 (e.g. as discrete components placed on a motherboard, etc.), may be placed on the memory module 280 (e.g. integrated into the address register logic 283, or data buffer logic 284, etc.), or may be part of the system 220 (e.g. integrated into the memory controller 221, etc.).

In various embodiments, some characteristics of the interface circuit 270 may include several system-facing interfaces. For example, a system address signal interface 271, a system control signal interface 272, a system clock signal interface 273, and a system data signal interface 274 may be included. The system-facing interfaces 271-274 may be capable of interrogating the system 220 and receiving information from the system 220. In various embodiments, such information may include information available from the memory controller 221, the memory attribute expectations 222, the memory interaction attributes 223, the data processing engine 224, the user interface 225 or the system BIOS 226.

Similarly, the interface circuit 270 may include several memory-facing interfaces. For example a memory address signal interface 275, a memory control signal interface 276, a memory clock signal interface 277, and a memory data signal interface 278 may be included. In another embodiment, an additional characteristic of the interface circuit 270 may be the optional presence of emulation logic 230. The emulation logic 230 may be operable to receive and optionally store electrical signals (e.g. logic levels, commands, signals, protocol sequences, communications, etc.) from or through the system-facing interfaces 271-274, and process those signals.

The emulation logic 230 may respond to signals from the system-facing interfaces 271-274 by responding back to the system 220 by presenting signals to the system 220, processing those signals with other information previously stored, or may present signals to the physical memory circuits 281. Further, the emulation logic 230 may perform any of the aforementioned operations in any order.

In one embodiment, the emulation logic 230 may be capable of adopting a personality, wherein such personality defines the attributes of the physical memory circuit 281. In various embodiments, the personality may be effected via any combination of bonding options, strapping, programmable strapping, the wiring between the interface circuit 270 and the physical memory circuits 281, and actual physical attributes (e.g. value of a mode register, value of an extended mode register, etc.) of the physical memory circuits 281 connected to the interface circuit 270 as determined at some moment when the interface circuit 270 and physical memory circuits 281 are powered up.

Physical attributes of the memory circuits 281 or of the system 220 may be determined by the emulation logic 230 through emulation logic interrogation of the system 220, the memory modules 280, or both. In some embodiments, the emulation logic 230 may interrogate the memory controller 221, the memory attribute expectations 222, the memory interaction attributes 223, the data processing engine 224, the user interface 225, or the system BIOS 226, and thereby adopt a personality. Additionally, in various embodiments, the functions of the emulation logic 230 may include refresh management logic 231, power management logic 232, delay management logic 233, one or more look-aside buffers 234, SPD logic 235, memory mode register logic 236, as well as RAS logic 237, and clock management logic 238.

The optional delay management logic 233 may operate to emulate a delay or delay sequence different from the delay or delay sequence presented to the emulation logic 230 from either the system 220 or from the physical memory circuits 281. For example, the delay management logic 233 may present staggered refresh signals to a series of memory circuits, thus permitting stacks of physical memory circuits to be used instead of discrete devices. In another case, the delay management logic 233 may introduce delays to integrate well-known memory system RAS functions such a hot-swap, sparing, and mirroring.

Figure 3:
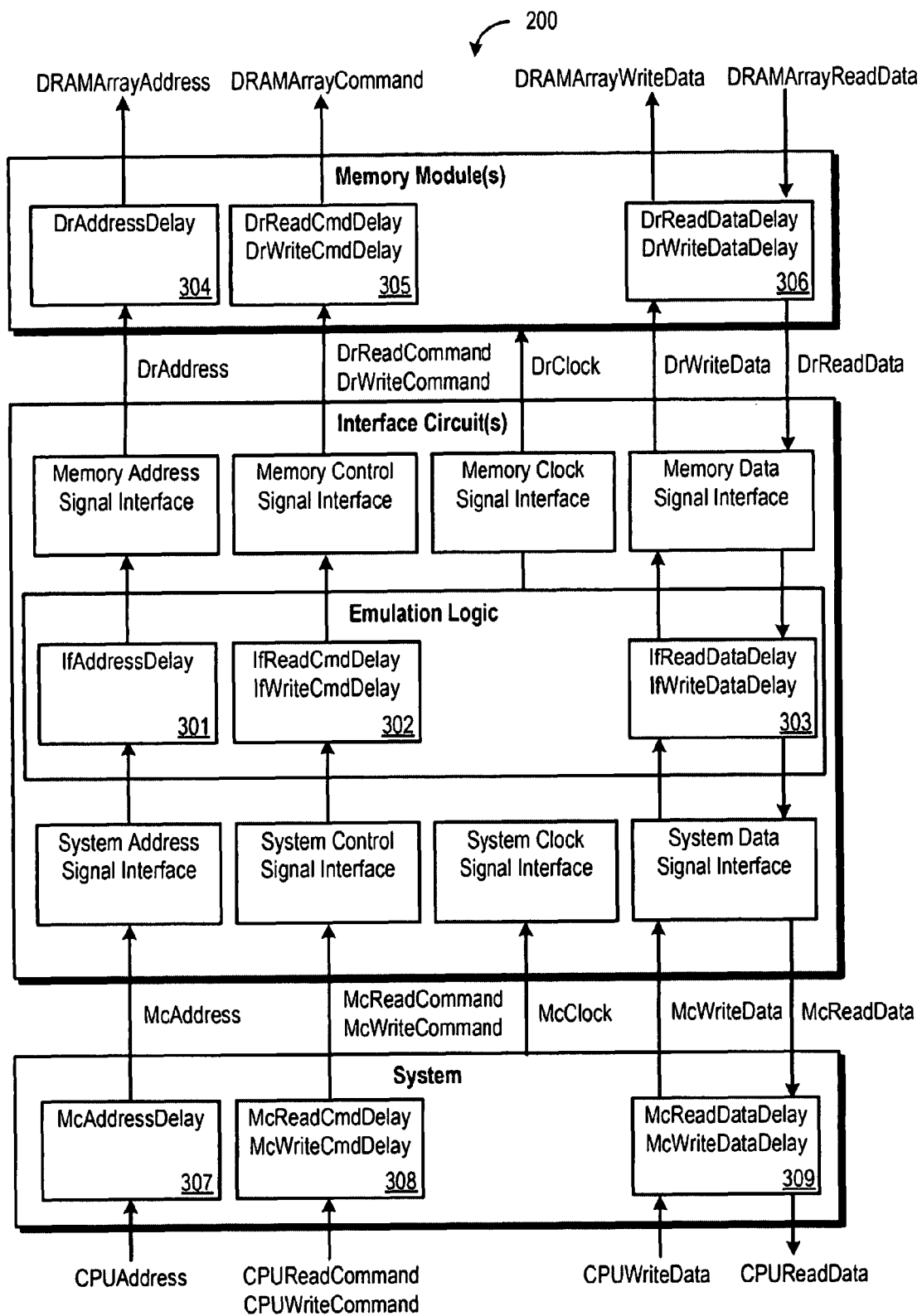
FIG. 3 shows the system platform of FIG. 2 including signals and delays, in accordance with one embodiment.

FIG. 3 shows the system platform 200 of FIG. 2 including signals and delays, in accordance with one embodiment. As an option, the signals and delays of FIG. 3 may be implemented in the context of the details of FIGS. 1-2. Of course, however, the signals and delays of FIG. 3 may be implemented in any desired environment. Further, the aforementioned definitions may apply during the present description.

It should be noted that the signals and other names in FIG. 3 use the abbreviation "Dr" for DRAM and "Mc" for memory controller. For example, "DrAddress" are the address signals at the DRAM, "DrControl" are the control signals defined by JEDEC standards (e.g. ODT, CK, CK#, CKE, CS#, RAS#, CAS#, WE#, DQS, DQS#, etc.) at the DRAM, and "DrReadData" and "DrWriteData" are the bidirectional data signals at the DRAM. Similarly, "McAddress," "McCmd," "McReadData," and "McWriteData" are the corresponding signals at the memory controller interface.

Each of the memory module(s), interface circuits(s) and system may add delay to signals in a memory system. In the case of memory modules, the delays may be due to the physical memory circuits (e.g. DRAM, etc.), and/or the address register logic, and/or data buffers and logic. In the case of the interface circuits, the delays may be due to the emulation logic under control of the delay management logic. In the case of the system, the delays may be due to the memory controller.

All of these delays may be modified to allow improvements in one or more aspects of system performance. For example, adding delays in the emulation logic allows the interface circuit(s) to perform power management by manipulating the CKE (i.e. a clock enable) control signals to the DRAM in order to place the DRAM in low-power states. As another example, adding delays in the emulation logic allows the interface circuit(s) to perform staggered refresh operations on the DRAM to reduce instantaneous power and allow other operations, such as I/O calibration, to be performed.

Adding delays to the emulation logic may also allow control and manipulation of the address, data, and control signals connected to the DRAM to permit stacks of physical memory circuits to be used instead of discrete DRAM devices. Additionally, adding delays to the emulation logic may allow the interface circuit(s) to perform RAS functions such as hot-swap, sparing and mirroring of memory. Still yet, adding delays to the emulation logic may allow logic to be added that performs translation between different protocols (e.g. translation between DDR and GDDR protocols, etc.). In summary, the controlled addition and manipulation of delays in the path between memory controller and physical memory circuits allows logic operations to be performed that may potentially enhance the features and performance of a memory system.

Two examples of adjusting timing of a memory system are set forth below. It should be noted that such examples are illustrative and should not be construed as limiting in any manner. Table 1 sets forth definitions of timing parameters and symbols used in the examples, where time and delay are measured in units of clock cycles.

In the context of the two examples, the first example illustrates the normal mode of operation of a DDR2 Registered DIMM (RDIMM). The second example illustrates the use of the interface circuit(s) to adjust timing in a memory system in order to add or implement improvements to the memory system.

TABLE 1

CAS (column address strobe) Latency (CL) is the time between READ command (DrReadCmd) and READ data (DrReadData).
Posted CAS Additive Latency (AL) delays the READ/WRITE command to the internal device (the DRAM array) by AL clock cycles.
READ Latency (RL) = AL + CL.
WRITE Latency (WL) = AL + CL − 1 (where 1 represents one clock cycle).

The above latency values and parameters are all defined by JEDEC standards. The timing examples used here will use the DDR2 JEDEC standard. Timing parameters for the DRAM devices are also defined in manufacturer datasheets (e.g. see Micron datasheet for 1 Gbit DDR2 SDRAM part MT47H256M4). The configuration and timing parameters for DIMMs may also be obtained from manufacturer datasheets [e.g. see Micron datasheet for 2 Gbyte DDR2 SDRAM Registered DIMM part MT36H2TF25672 (P)].

Additionally, the above latency values and parameters are as seen and measured at the DRAM and not necessarily equal to the values seen by the memory controller. The parameters illustrated in Table 2 will be used to describe the latency values and parameters seen at the DRAM.

TABLE 2

DrCL is the CL of the DRAM.
DrWL is the WL of the DRAM.
DrRL is the RL of the DRAM.

It should be noted that the latency values and parameters programmed into the memory controller are not necessarily the same as the latency of the signals seen at the memory controller. The parameters shown in Table 3 may be used to make the distinction between DRAM and memory controller timing and the programmed parameter values clear.

TABLE 3

McCL is the CL as seen at the memory controller interface.
McWL is the WL as seen at the memory controller interface.
McRL is the RL as seen at the memory controller interface.

In this case, when the memory controller is set to operate with DRAM devices that have CL =4 on an R-DIMM, the extra clock cycle delay due to the register on the R-DIMM may be hidden to a user. For an R-DIMM using CL =4 DRAM, the memory controller McCL =5. It is still common to refer to the memory controller latency as being set for CL =4 in this situation. In this situation, the first and second examples will refer to McCL =5, however, noting that the register is present and adding delay in an R-DIMM. The symbols in Table 4 are used to represent the delays in various parts of the memory system (again in clock cycles).

TABLE 4

IfAddressDelay 301 is additional delay of Address signals by the interface circuit(s).
IfReadCmdDelay and IfWriteCmdDelay 302 is additional delay of READ and WRITE commands by the interface circuit(s).
IfReadDataDelay and IfWriteDataDelay 303 is additional delay of READ and WRITE Data signals by the interface circuit(s).
DrAddressDelay 304, DrReadCmdDelay and DrWriteCmdDelay 305,
DrReadDataDelay and DrWriteDataDelay 306 is delay for the DRAM.
McAddressDelay 307, McReadCmdDelay 308, McWriteCmdDelay 308,
McReadDataDelay and McWriteDataDelay 309 is delay for the memory controller.

In the first example, it is assumed that DRAM parameters DrCL=4, DrAL=0, all memory controller delays are 0 (McAddressDelay, McReadDelay, McWriteDelay, and McDataDelay), and that all DRAM delays are 0 (DrAddressDelay, DrReadDelay, DrWriteDelay, and DrDataDelay). Furthermore, assumptions for the emulation logic delays are shown in Table 5.

TABLE 5

IfAddressDelay = 1
IfReadCmdDelay = 1
IfWriteCmdDelay = 1
IfReadDataDelay = 0
IfWriteDataDelay = 0

In the first example, the emulation logic is acting as a normal JEDEC register and delaying the Address and Command signals by one clock cycle (corresponding to IfAddressDelay=1, ifWriteCmdDely=1, IfReadCmdDelay=1). In this case, the equations shown in Table 6 describe the timing of the signals at the DRAM. Table 7 shows the timing of the signals at the memory controller.

TABLE 6

READ: DrReadData − DrReadCmd = DrCL = 4
WRITE: DrWriteData − DrWriteCmd = DrWL = DrCL − 1 = 3

TABLE 7

Since IfReadCmdDelay = 1, DrReadCmd = McReadCmd + 1 (commands are delayed by one cycle), and DrReadData = McReadData (no delay), READ is McReadData − McReadCmd = McCL = 4 + 1 = 5.
Since IfWriteCmdDelay = 1, DrWriteCmd = McWriteCmd + 1 (delayed by one cycle), and DrWriteData = McWriteData (no delay), WRITE is McWriteData − McWriteCmd = McWL = 3 + 1 = 4 = McCL − 1.

This example with McCL=5 corresponds to the normal mode of operation for a DDR2 RDIMM using CL=4 DRAM.

In one case, it may be desirable for the emulation logic to perform logic functions that will improve one or more aspects of the performance of a memory system as described above. To do this, extra logic may be inserted in the emulation logic data paths. In this case, the addition of the emulation logic may add some delay. In one embodiment, a technique may be utilized to account for the delay and allow the memory controller and DRAM to continue to work together in a memory system in the presence of the added delay. In the second example, it is assumed that the DRAM timing parameters are the same as noted above in the first example, however the emulation logic delays are as shown in Table 8 below.

TABLE 8

IfAddressDelay = 2
IfReadCmdDelay = 2
IfReadDataDelay = 1
IfWriteDataDelay = 1
The CAS latency requirement must be met at the DRAM for READs, thus READ is DrReadData − DrReadCmd = DrCL = 4.

In order to meet this DRAM requirement, McCL, the CAS Latency as seen at the memory controller, may be set higher than in the first example to allow for the interface circuit READ data delay (IfDataDelay=1), since now McReadData=DrReadData+1, and to allow for the increased interface READ command delay, since now DrReadCmd=McReadCmd+2. Thus, in this case, the READ timing is as illustrated in Table 9.

TABLE 9

READ: McCL = McReadData − McReadCmd = 7

By setting the CAS latency, as viewed and interpreted by the memory controller, to a higher value than required by the DRAM CAS latency, the memory controller may be tricked into believing that the additional delays of the interface circuit(s) are due to a lower speed (i.e. higher CAS latency) DRAM. In this case, the memory controller may be set to McCL=7 and may view the DRAM on the RDIMM as having a CAS latency of CL=6 (whereas the real DRAM CAS latency is CL=4).

In certain embodiments, however, introducing the emulation logic delay may create a problem for the WRITE commands in this example. For instance, the memory system should meet the WRITE latency requirement at the DRAM, which is the same as the first example, and is shown in Table 10.

TABLE 10

WRITE: DrWriteData − DrWriteCmd = DrWL = 3

Since the WRITE latency WL=CL−1, the memory controller is programmed such that McWL=McCL−1=6. Thus, the memory controller is placing the WRITE data on the bus later than in the first example. In this case, the memory controller "thinks" that it needs to do this to meet the DRAM requirements. Unfortunately, the interface circuit(s) further delay the WRITE data over the first example (since now IfWriteDataDelay=1 instead of 0). Now, the WRITE latency requirement may not be met at the DRAM if IfWriteCmdDelay=IfReadCmdDelay as in the first example.

In one embodiment, the WRITE commands may be delayed by adjusting IfWriteCmdDelay in order to meet the WRITE latency requirement at the DRAM. In this case, the WRITE timing may be expressed around the "loop" formed by IfWriteCmdDelay, McWL, DrWL and IfWriteCmdDelay as shown in Table 11.

TABLE 11

WRITE: IfWriteCmdDelay = McWL + IfWriteDataDelay − DrWL = 6 + 1 − 3 = 4

Since IfWriteCmdDelay=4, and IfReadCmdDelay=2, the WRITE timing requirement corresponds to delaying the WRITE commands by an additional two clock cycles over the READ commands. This additional two-cycle delay may easily be performed by the emulation logic, for example. Note that no changes have to be made to the DRAM and no changes, other than programmed values, have been made to the memory controller. It should be noted that such memory system improvements may be made with minimal or no changes to the memory system itself.

It should be noted that any combination of DRAM, interface circuit, or system logic delays may be used that result in the system meeting the timing requirements at the DRAM interface in the above examples. For example, instead of introducing a delay of two cycles for the WRITE commands in the second example noted above, the timing of the memory controller may be altered to place the WRITE data on the bus two cycles earlier than normal operation. In another case, the delays may be partitioned between interface logic and the memory controller or partitioned between any two elements in the WRITE data paths.

Timing adjustments in above examples were described in terms of integer multiples of clock cycles to simplify the descriptions. However, the timing adjustments need not be exact integer multiples of clock cycles. In other embodiments, the adjustments may be made as fractions of clock cycles (e.g. 0.5 cycles, etc.) or any other number (1.5 clock cycles, etc.).

Additionally, timing adjustments in the above examples were made using constant delays. However, in other embodiments, the timing adjustments need not be constant. For example, different timing adjustments may be made for different commands. Additionally, different timing adjustments may also be made depending on other factors, such as a specific sequence of commands, etc.

Furthermore, different timing adjustments may be made depending on a user-specified or otherwise specified control, such as power or interface speed requirements, for example. Any timing adjustment may be made at any time such that the timing specifications continue to be met at the memory system interface(s) (e.g. the memory controller and/or DRAM interface). In various embodiments, one or more techniques may be implemented to alter one or more timing parameters and make timing adjustments so that timing requirements are still met.

The second example noted above was presented for altering timing parameters and adjusting timing in order to add logic which may improve memory system performance. Additionally, the CAS latency timing parameter, CL or tCL, was altered at the memory controller and the timing adjusted using the emulation logic. A non-exhaustive list of examples of other various timing parameters that may be similarly altered are shown in Table 12 (from DDR2 and DDR3 DRAM device data sheets).

TABLE 12 tAL, Posted CAS Additive Latency
tFAW, 4-Bank Activate Period
tRAS, Active-to-Precharge Command Period
tRC, Active-to-Active (same bank) Period
tRCD, Active-to-Read or Write Delay
tRFC, Refresh-to-Active or Refresh-to-Refresh Period
tRP, Precharge Command Period
tRRD, Active Bank A to Active Bank B Command Period
tRTP, Internal Read-to-Precharge Period
tWR, Write Recovery Time
tWTR, Internal Write-to-Read Command Delay Of course, any timing parameter or parameters that impose a timing requirement at the memory system interface(s) (e.g. memory controller and/or DRAM interface) may be altered using the timing adjustment methods described here. Alterations to timing parameters may be performed for other similar memory system protocols (e.g. GDDR) using techniques the same or similar to the techniques described herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a memory controller;
a memory module, wherein the memory module includes memory devices, the memory devices having an actual CAS (column address strobe) latency; and
an interface circuit coupled to the memory controller, wherein the interface circuit is configured to adjust timing of signals associated with one or more of the memory controller and the memory module,
wherein the memory controller is programmed with a CAS latency parameter set to a value that causes the memory controller to view the memory devices on the memory module as having a higher CAS latency than the actual CAS latency of the memory devices.

2. The system of claim 1, wherein the signals include address signals.

3. The system of claim 1, wherein the signals include control signals.

4. The system of claim 1, wherein the signals include data signals.

5. The system of claim 1, wherein the adjustment of the timing of the signals allows for insertion of additional logic for use in the one or more of the memory controller and the memory module.

6. The system of claim 5, wherein the additional logic improves performance of one or more aspects of the one or more of the memory controller and the memory module.

7. The system of claim 6, wherein the one or more aspects include reliability, accessibility and serviceability (RAS) functions.

8. The system of claim 6, wherein the one or more aspects include power management functions.

9. The system of claim 6, wherein the one or more aspects include mirroring of memory.

10. The system of claim 6, wherein the performance of one or more aspects are improved without physical changes.

11. The system of claim 1, wherein the timing is adjusted based on at least one timing requirement.

12. The system of claim 11, wherein the at least one timing requirement is specified by at least one timing parameter at one or more interfaces included in the one or more of the memory controller and the at least one memory module.

13. The system of claim 12, wherein the adjusting includes modifying one or more delays.

14. The system of claim 12, wherein the at least one timing parameter is modified to allow the adjusting of the timing.

15. The system of claim 1, wherein the timing is adjusted under user control.

16. The system of claim 1, wherein the signals include a command.

17. The system of claim 16, wherein the timing is adjusted based on a type of the command.

18. The system of claim 1, wherein the timing is adjusted based on a sequence of commands.

19. A subsystem, comprising:
an interface circuit configured for communicating with a memory controller and a memory module, wherein the memory module includes memory devices, the memory devices having an actual CAS (column address strobe) latency,
the interface circuit configured for adjusting timing of signals associated with one or more of the memory controller and the memory module,
wherein the memory controller is programmed with a CAS latency parameter set to a value that causes the memory controller to view the memory devices on the memory module as having a higher CAS latency than the actual CAS latency of the memory devices.

20. A method, comprising:
providing at least one interface circuit configured for communicating with a memory controller and a memory module, wherein the memory module includes memory devices, the memory devices having an actual CAS (column address strobe) latency;
adjusting timing of signals associated with one or more of the memory controller and the memory module, utilizing the at least one interface circuit, and
programming the memory controller with a CAS latency parameter set to a value that causes the memory controller to view the memory devices on the memory module as having a higher CAS latency than the actual CAS latency of the memory devices.

21. The apparatus of claim 19, wherein the interface circuit is configured to delay write commands from the memory controller to the memory devices.

22. The apparatus of claim 19, wherein the interface circuit is configured to add a delay to write commands from the memory controller to the memory devices equal to the difference between the the higher CAS latency and the actual CAS latency.

23. The apparatus of claim 19, wherein the interface circuit includes additional logic, the additional logic performing additional functions not accounted for by the memory controller, wherein the difference between the the higher CAS latency and the actual CAS latency is sufficient for the additional logic to perform the additional functions.

24. A system, comprising:
a memory controller;
a memory module, wherein the memory module includes memory devices, the memory devices having an actual CAS (column address strobe) latency; and
an interface circuit coupled to the memory controller,
wherein the memory controller is programmed with a CAS latency parameter set to a value that causes the memory controller to view the memory devices on the memory module as having a higher CAS latency than the actual CAS latency of the memory devices.

25. The system of claim 24, wherein the higher CAS latency is a whole number of clock cycles above the actual CAS latency.

26. The system of claim 24, wherein the higher CAS latency is not a whole number of clock cycles above the actual CAS latency.

27. The system of claim 24, wherein the higher CAS latency is at least two clock cycles above the actual CAS latency.

28. The system of claim 24, wherein the interface circuit is configured to delay write commands from the memory controller to the memory devices.

29. The system of claim 24, wherein the interface circuit is configured to delay write commands from the memory controller to the memory devices by an amount of time equal to the difference between the higher CAS latency and the actual CAS latency.

30. The system of claim 24, wherein the memory module includes additional logic, the additional logic performing additional functions not accounted for by the memory controller, wherein the difference between the higher CAS latency and the actual CAS latency of the memory devices is sufficient for the additional logic to perform the additional functions.

* * * * *

UNITED STATES PATENT AND TRADEMARK OFFICE
CERTIFICATE OF CORRECTION

| | | |
|---|---|---|
| PATENT NO. | : 8,327,104 B2 | |
| APPLICATION NO. | : 11/939440 | |
| DATED | : December 4, 2012 | |
| INVENTOR(S) | : Michael John Sebastian Smith et al. | |

It is certified that error appears in the above-identified patent and that said Letters Patent is hereby corrected as shown below:

Column 10, Line 43, Claim 12, after "the" delete "at least one".

Column 10, Line 56, Claim 19, delete "A subsystem," insert --An apparatus--.

Column 11, Line 22, Claim 22, after "between" delete "the".

Column 11, Line 27, Claim 23, after "between" delete "the".

Signed and Sealed this
Sixteenth Day of April, 2013

Teresa Stanek Rea
*Acting Director of the United States Patent and Trademark Office*